United States Patent [19]
Klinner

[11] Patent Number: 4,660,362
[45] Date of Patent: * Apr. 28, 1987

[54] CROP ENGAGING DEVICE

[75] Inventor: Wilfred E. Klinner, Milton Keynes, England

[73] Assignee: National Research Development Corporation, London, England

[*] Notice: The portion of the term of this patent subsequent to Apr. 23, 2002 has been disclaimed.

[21] Appl. No.: 701,013

[22] Filed: Feb. 12, 1985

Related U.S. Application Data

[63] Continuation-in-part of Ser. No. 430,594, Sep. 30, 1982, Pat. No. 4,512,146, and Ser. No. 477,872, Mar. 23, 1983, Pat. No. 4,545,188.

[30] Foreign Application Priority Data

| Oct. 5, 1981 | [GB] | United Kingdom | 8129970 |
| Dec. 4, 1981 | [GB] | United Kingdom | 8136651 |
| Mar. 26, 1982 | [GB] | United Kingdom | 8209019 |
| Mar. 11, 1983 | [EP] | European Pat. Off. | 83301363.4 |
| Mar. 11, 1983 | [GB] | United Kingdom | 8306762 |
| Mar. 17, 1983 | [DK] | Denmark | 1235/83 |

[51] Int. Cl.⁴ .................... A01D 43/02; A01D 82/00
[52] U.S. Cl. .......................................... 56/364; 56/400
[58] Field of Search ................................ 56/364, 400

[56] References Cited

U.S. PATENT DOCUMENTS

| 3,125,845 | 3/1964 | Lee | 56/364 |
| 3,126,693 | 3/1964 | Renn | 56/364 |
| 3,295,302 | 1/1967 | Lee | 56/400 |
| 3,531,927 | 10/1970 | Wood | 56/400 |
| 3,713,283 | 1/1973 | Fritz | 56/400 |
| 4,021,995 | 5/1977 | Hill | 56/400 |
| 4,161,859 | 7/1979 | Storm et al. | 56/364 |
| 4,182,102 | 1/1980 | Anderson et al. | 56/364 |
| 4,255,923 | 3/1981 | Spaida et al. | 56/364 |
| 4,512,146 | 4/1985 | Klinner | 56/364 |
| 4,545,188 | 10/1985 | Klinner | 56/364 |

FOREIGN PATENT DOCUMENTS

| 690268 | 3/1940 | Fed. Rep. of Germany . |
| WO79/863 | 11/1979 | PCT Int'l Appl. . |
| 198256 | 5/1923 | United Kingdom . |
| 967207 | 8/1964 | United Kingdom | 56/400 |

Primary Examiner—Paul J. Hirsch
Attorney, Agent, or Firm—Cushman, Darby & Cushman

[57] ABSTRACT

A crop engaging rotor for conveying and/or conditioning or otherwise treating crop comprises support members 12 and a plurality of outwardly extending crop engaging elements 11. Each crop engaging element 11 is made of stiff resilient synthetic plastics material and forms two outwardly extending arms 21 and 22 generally in a V-shape. The element 11 is secured to a flange 14 or 14A of a transverse mounting bar 12 which forms part of the rotor. The arms 21 and 22 are yieldable to move rearwardly under excess load conditions by a rocking movement about the bolt 23. The element 11 is prevented from rotating about the bolt 23 by abutment of the leading edge surfaces of the arms 21 and 22 against the inner surface of the upstanding portion 14A of the member 12, by abutment of the base of the element 11 against the base flange 14 of the member 12.

26 Claims, 34 Drawing Figures

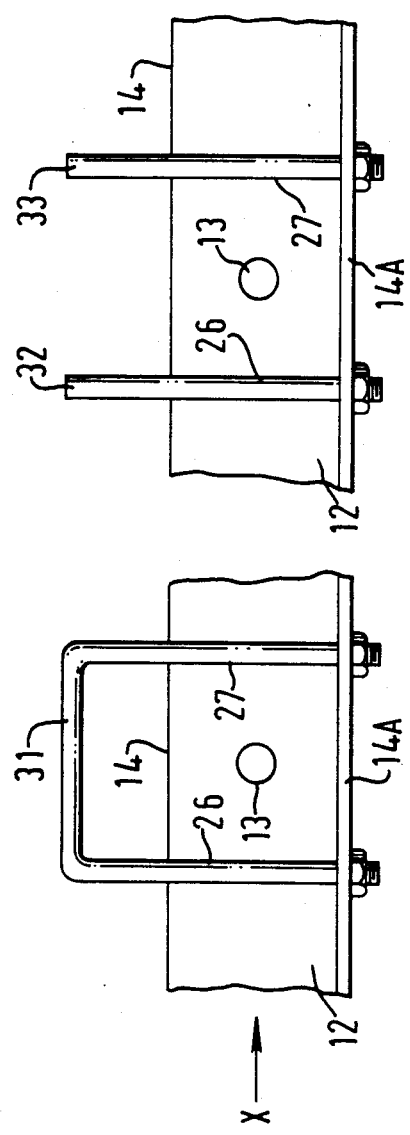
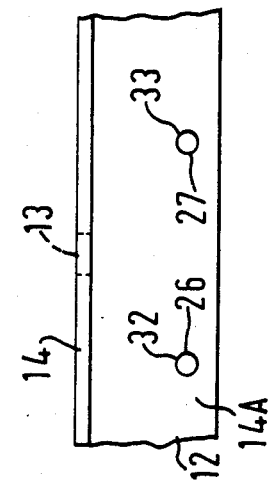
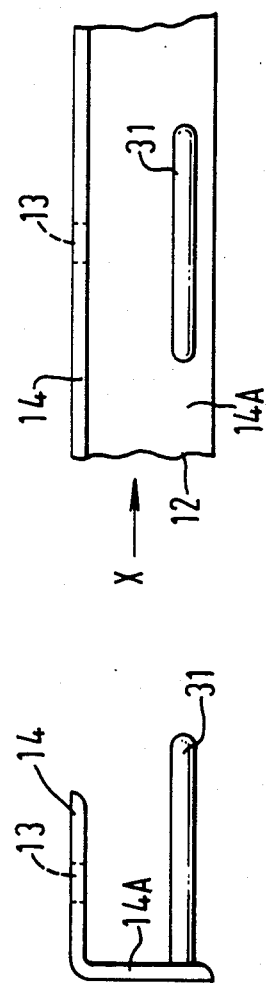

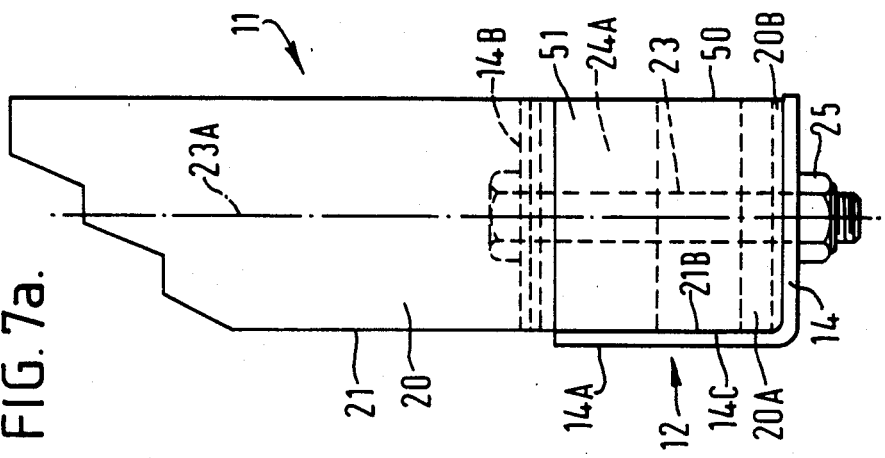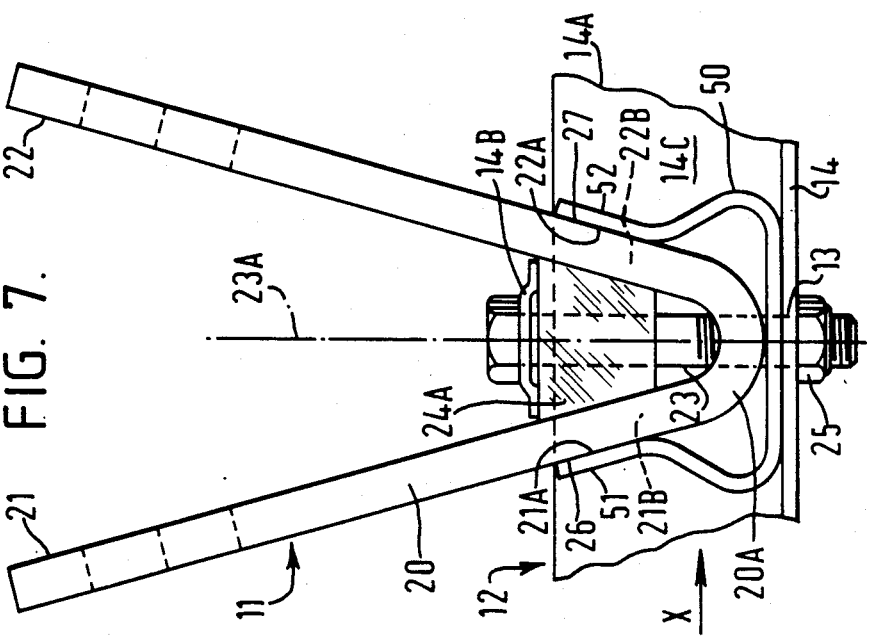

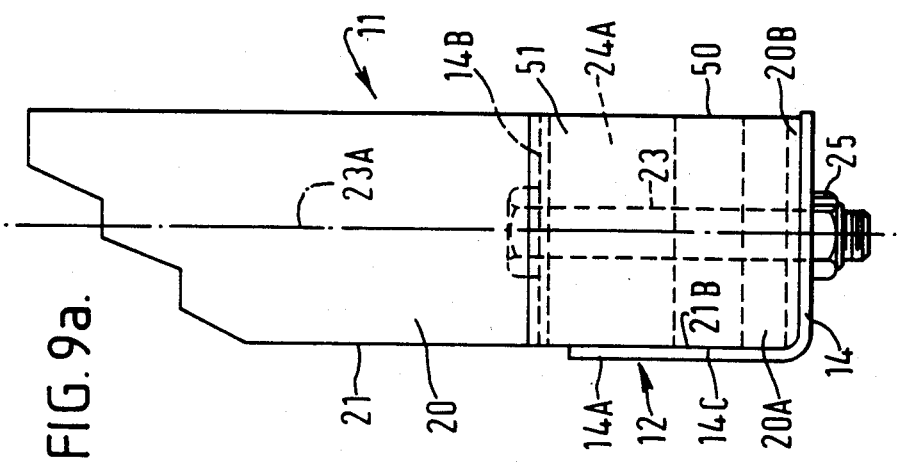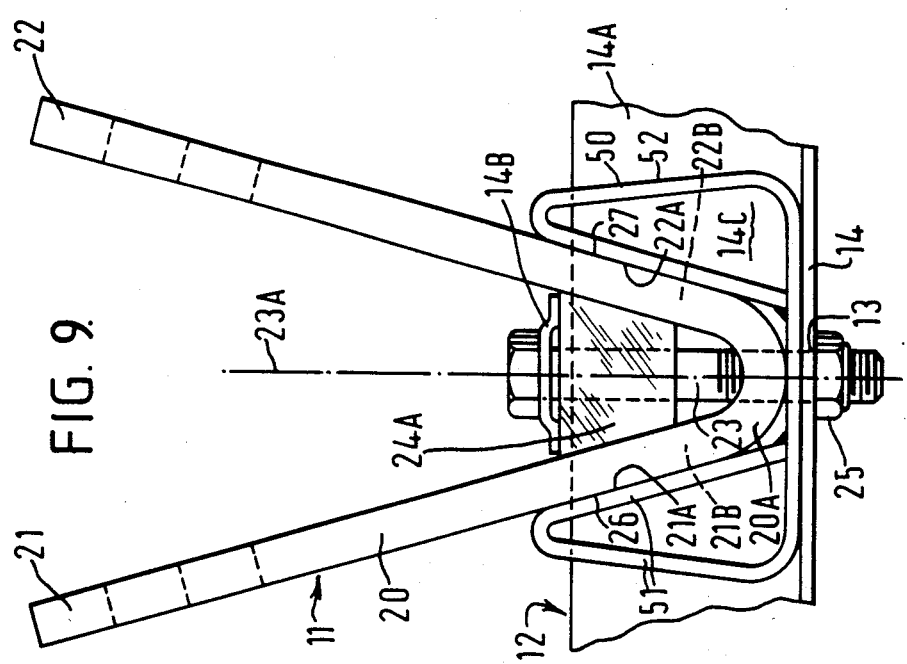

FIG. 13c.

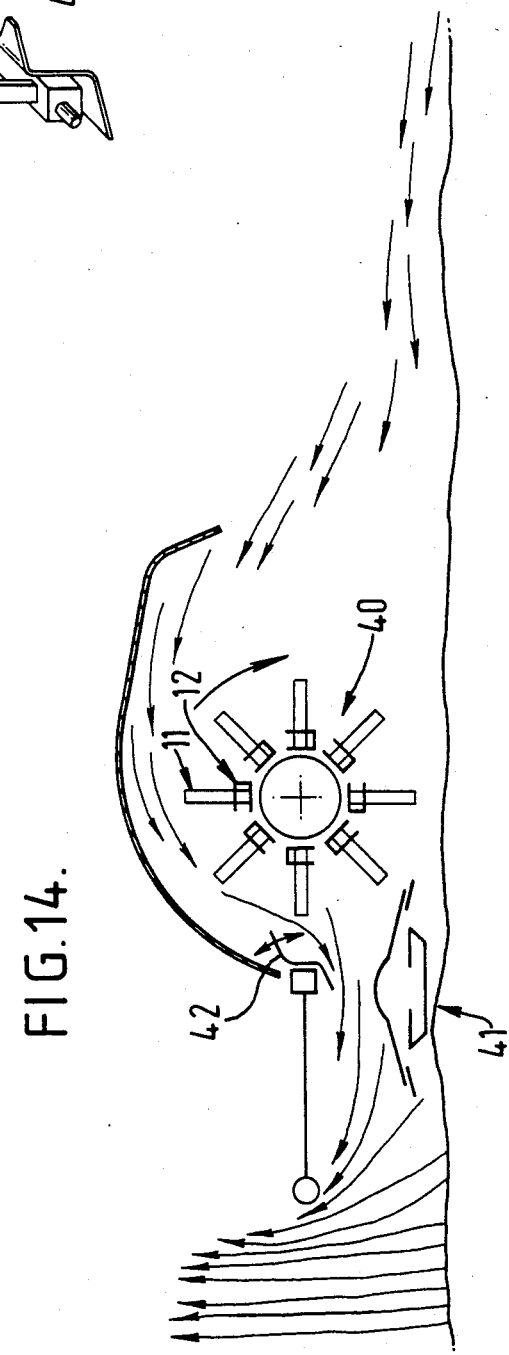

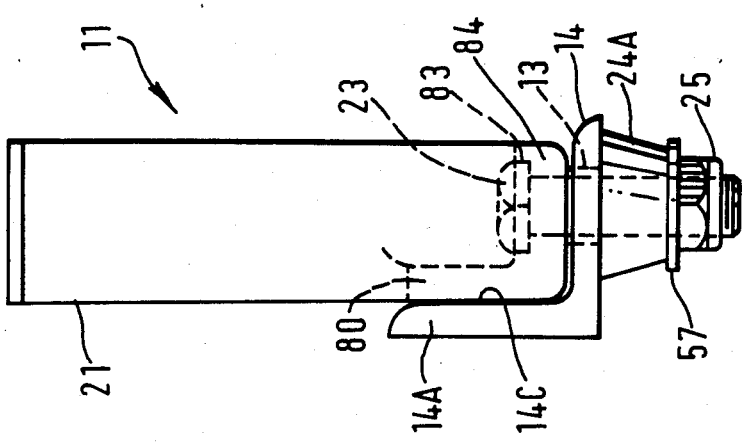
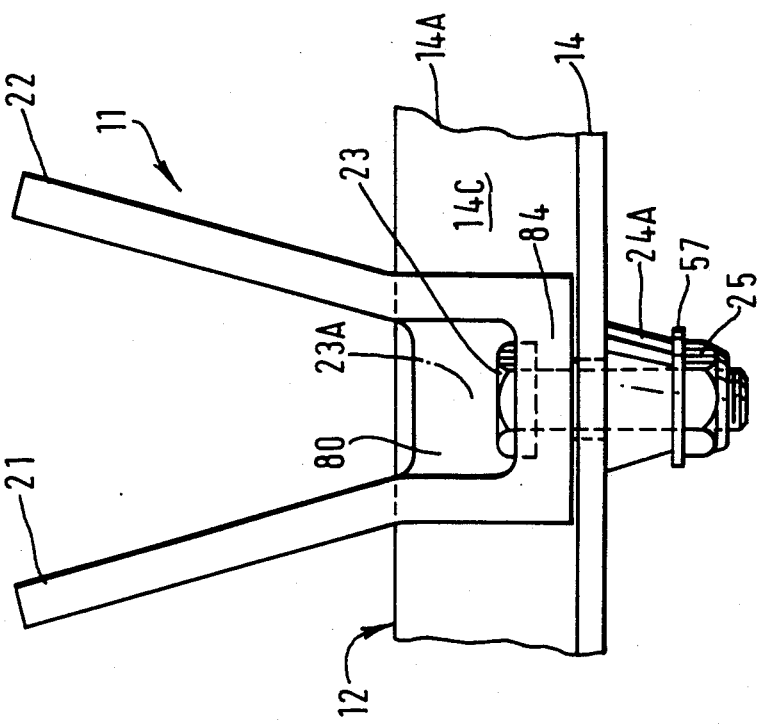

CROP ENGAGING DEVICE

BACKGROUND OF INVENTION

This application is a continuation-in-part of U.S. patent applications Ser. No. 430,594 filed Sept. 30, 1982, now U.S. Pat. No. 4,512,146, and Ser. No. 477,872, filed Mar. 23, 1983, now U.S. Pat. No. 4,545,188.

The present invention relates to a crop engaging device. The invention is concerned in one aspect with apparatus for conditioning of crops especially, but not exclusively, grasses, and is concerned in other applications with pick-up and conveying rotors for collecting cut crop and conveying the same, and for other crop treatment such as threshing.

DESCRIPTION OF PRIOR ART

Considering firstly the aspect of the present invention concerned with conditioning of crops, it is well known to treat forage crops such as grasses and legumes in order to assist loss of moisture in the field after cutting prior to storage to provide animal fodder. The speed at which surface and sap moisture evaporate from the cut crop during field exposure depends inter alia on the physical condition of the crop. The principal barrier to moisture loss is the cuticle and the layer of epicuticular wax on the crop surface, and it is now common practice in agriculture to mechanically treat the crop in order to damage this barrier. Such mechanical treatment, which may take the form of crushing, lacerating, bruising, splitting, spiking, bending or scuffing the stems and leaves of the crop, is known as "conditioning". In our UK Pat. No. 1,322,165 there are described conditioning elements formed in the shape of a V or Y and yieldably mounted on a rotor, the elements being yieldable by virtue of being pivotted at their main point of securement to the rotor. This allows the conditioning elements to yield in operation in contact with stones or other foreign objects found in the crop. However a disadvantage of such free pivotting is that the elements can also yield in response to unusually high crop loads, unless they are heavy and the rotor is rotated at a relatively high speed in order to maintain the conditioning elements in an outwardly extending position by virtue of centrifugal force.

In our later UK Pat. No. 1493574 there are disclosed conditioning elements which also take the form of a V. The conditioning elements are resiliently mounted so as to be maintained in an outward operative position without the need to rely on centrifugal force, but are yieldable by pivotting against the resilient locating means. Such conditioning means offer many advantages and have found wide acceptance in practice, but are relatively complicated in construction, and expensive to manufacture.

In a U.S. Pat. Specification No. 4,021,995 (Hill) there are disclosed conditioning elements which take the form of a U with inclined sides, and which are resiliently mounted. Again the structure is complicated, and each conditioning element is secured by two bolts passing through the entire rotor assembly.

Considering now another aspect of the invention concerned with pick-up rotors for collecting cut crop, and conveying rotors for crop in general, there have been known previously a number of forms of crop conveying rotors having outwardly directed crop conveying elements, commonly known as tines. One form of such crop conveying elements is disclosed in UK Patent No. 967207 (Teagle), which discloses V-shaped tines in which the two arms of the V are formed from a single length of material which is shaped in the form of a V and which is secured to the rotor by the two arms of the V passing through a hollow transverse supporting tube. However, the formation of the tine from a single length of material is merely a convenient way of supporting the two arms of the tine on the rotor, and has no particular function with regard to the characteristics of the times.

Other prior art which is relevant to the present application is German Specification DE-C-No. 400041 (Martin) and British equivalent GB-A-No. 198256; German Specification DE-C-No. 690268 (Lythall); and a British Specification disclosing work by the inventor of the present application, GB-A-No. 2075816 (NRDC).

The Martin specification discloses tines for side delivery rakes and swath turners having a U-shaped tine b (FIG. 4) mounted on a cross member a by a bolt d and spring e (e.g. FIG. 1) allowing tilting movement (FIG. 3). The Lythall specification discloses U-shaped tines 6 (e.g. FIG. 1) secured to a cross member 8 by a bolt 14 and spring 15 (e.g. FIG. 7) allowing tilting motion. The NRDC specification discloses brush elements for pick-up and conditioning of crop formed by folding over lengths of plastics material (FIG. 4 and FIG. 15) and securing the elements by a bolt 23 to a cross bar 17 (FIG. 3).

The Martin and Lythall disclosures provide relatively complicated structures suitable for relatively heavy metal tines and are unsuited to lightweight, high speed rotary devices. The NRDC disclosure also sets out a structure which has a relatively large number of parts and is time consuming to construct, and which, although a considerable improvement on previous devices, does not provide many of the features found in the present invention.

SUMMARY OF INVENTION

The present invention is concerned with providing crop engaging elements which can be maintained in an outwardly directed operative position without the need to rely upon centrifugal force, which are yieldable when in contact with foreign material in the crop, and which are relatively simple and inexpensive to manufacture and maintain.

According to the present invention in one aspect there is provided a crop engaging device comprising: support means including a rotor and frame means for mounting said rotor for rotation and for movement along the ground; a plurality of outwardly extending crop engaging elements secured to the rotor for engaging crop in a crop flow during rotation; each crop engaging element having a base portion adapted for securement to the rotor, and a crop engaging portion extending outwardly from the rotor into the crop flow and inclined relative to the rotor in a plane generally transverse to the direction of movement of the crop engaging portion, said rotor comprising a plurality of support members each having a base portion and an upstanding shielding portion, said upstanding shielding portion being arranged in front of the base portion of the crop engaging element relative to the direction of movement of the crop engaging element, each element base portion being secured to one of the said support members by an axial fastening means having a principal axis along which it extends through the support member to secure the element thereto, the support members and each crop engaging element having cooperating abutment regions such as to at least inhibit rotation of the crop engaging element away from its required operating position under normal load conditions, but such as to allow the crop engaging element to be yielding under an abnormal load by movement of the crop engaging portion rearwardly in relation to direction of movement of the element, the rear surface of the upstanding shielding portion of the support member being utilised to provide at least one of the said abutment regions for at least inhibiting rotation of the crop engaging element away from its required operating position, and the mounting of each element being such that the retaining force in the axial fastening means retaining the element during yielding is predominantly tension along the said axis of the fastening means.

In prefered arrangements the said yielding movement is predominantly a pivotting movement of the element about an axis transverse to the principal axis of the axial fastening means.

In many applications of the invention the said cooperating abutment surfaces are effective to prevent or inhibit rotation of the crop engaging element about the principal axis of the fastening means.

In many prefered forms, the said support means comprises an elongate support member extending transverse to the intended movement of the crop engaging elements relative to the crop with a plurality of crop engaging elements positioned along the elongated support member, the cooperating abutment regions being arranged to prevent or inhibit rotation of the element about an axis extending into the crop perpendicular to the said base portion of the support member, and the said yielding movement comprising predominantly a pivotting movement about an axis generally aligned along the length of the elongate support member.

Conveniently each crop engaging element comprises an elongate member shaped to produce a configuration in which the member forms two outwardly extending arms which diverge from each other in the outward direction and in a plane generally transverse to the intended movement of the arms with or relative to the crop, the elongate member being secured to the support means at the region of conjunction of the two arms.

In one arrangement the inclined crop engaging portions of the elements are located by guides of the support means which provide at least some of the abutment regions of the support means, the crop engaging elements being yieldable relative to the support means by sliding movement along the said guides.

The invention provides in one arrangement a construction where each said elongate member is formed of stiff resilient material, and is folded to produce the said configuration, the said divergent arms being biased apart by virtue of the springiness of the said material and being arranged to bear against the said guides of the support means, which guides retain the arms in the said configuration against the bias urging the arms apart.

Each elongate member may be a flat strip of material arranged with the flat outer surfaces of the two arms bearing against the said guides. The flat strip may be folded about an axis at right angles to the length of the strip and lying in the plane of the strip. However, in other arrangements the strip may be folded in more than one place, for example to produce a generally U-shaped configuration (but with at least slightly divergent arms) rather than a V-shaped configuration, and it is also possible for the strip to be folded about an axis which is inclined to the length of the strip at an angle other than a right angle. Rod-like or tubular material may also be used in place of strip, with a flat portion at the fold or conjunction of the two arms of each crop engaging element.

In one form, the said support means comprises a transverse channel-section support member, each shaped elongate member being secured to the inner surface of one of the flanges of the said channel-section with the said conjunction of the arms of the element within the channel-section, said one flange constituting said base portion of said support means, there being provided in the opposite flange of the said channel-section an opening or openings through which the said arms of the element pass, the said guides of the said support means being provided by the sides of the said opening or openings in the said second-mentioned flange of the channel-section.

In some arrangements the axial fastening means secures the crop engaging element to the support means by passing through the base portion of the element along the said principal axis of the fastening means and conveniently the said principal axis of the axial fastening means extends perpendicular to said base portion of said support means.

In accordance with one optional feature of the invention, the support means may include at each element a bracket shaped to support the crop engaging portion of the element at the said inclination relative to the support means.

Also in accordance with an optional feature the support means may include at each crop engaging element a bracket engaged with the base portion of the element, said fastening means securing the element to the support means by passing through the bracket. The fastening means may secure the crop engaging element to the upstanding shielding portion of the support means.

The bracket may be arranged to move wholly or predominantly with the crop engaging element during the said yielding movement.

In forms of the invention where each crop engaging element comprises an elongate member shaped to produce a configuration in which the member forms two outwardly extending arms which diverge from each other in the outward direction and in a plane generally transverse to the intended movement of the arms with or relative to the crop, the elongate member being secured to the support means at the region of conjunction of the two arms, it may be arranged that each elongate member is folded to produce the said configuration, and the said divergent arms are biased apart by virtue of the springiness of the said material and are arranged to bear against the said bracket which retains the arms in the said configuration against the bias urging the arms apart.

Each elongate member may be a flat strip of material arranged with the flat outer surfaces of the two arms bearing against the said bracket.

In some arrangements at least some of the cooperating abutment regions are constituted by the rear surface of the upstanding shielding portion of the support means and the leading surfaces of the crop engaging devices and/or said brackets where provided, the arrangement being such that during the said yielding movement the crop engaging portion of a yielding element tips rearwardly away from the said shielding portion of the support means with the said abutment regions moving apart. Conveniently each elongate member may be formed from a flat strip of material arranged with an edge surface of the strip abutting against the said upstanding shielding portion of the support means.

The said yielding movement may be produced by any one or a combination of different effects, for example by pivoting, rocking and/or twisting, but it is preferred that the said yielding movement is produced at least in part by a rocking movement of the element as a whole, e.g. about an axis perpendicular to the axis of the axial fastening means. In other arrangements, or in combination with this arrangement, the said yielding movement may be produced at least in part by bending and/or twisting of the crop engaging portion of the element.

Where each crop engaging element comprises a folded elongate member conveniently the axis of the axial fastening means extends along an axis perpendicular to an axis or axes along which the elongate member is folded.

Conveniently each crop engaging element is secured by a single axial fastening means which may comprise a bolt passing through an aperture in the base portion of the element, and secured to the support means by a nut and washer arrangement. The axial fastening means may conveniently include resilient biasing means urging the base portion of the crop engaging element against the support means but allowing movement of the element away from the support means along the direction of the axis of the fastening means to provide at least in part the said yielding movement. Thus where for example the fastening means comprises a bolt passing through an opening in the base portion of an element, there may be provided a block of elastomeric material such as rubber holding the base portion against the support means but allowing movement of the element as a whole in a rocking movement compressing the block of elastomeric material.

It is an advantage that the said support means can be arranged both to support the crop engaging elements, and also to afford protection against damage by stones and like objects in the crop, the upstanding shielding portion being ahead of the element relative to movement between the crop and the element in operation, for the purpose of shielding the base of the element against damage by stones and like foreign matter in the crop.

As has been mentioned, in one convenient form the said support means comprises a transverse channel-section support member, each crop engaging element being secured to the inner surface of one of the flanges of the said channel-section with the said base portion of the element within the channel-section, there being provided in the opposite flange of the said channel-section an opening or openings through which divergent arms of the element pass, the said abutment region of the said support means being provided by the sides of the said opening or openings in the said second-mentioned flange of the channel-section. Conveniently the first-mentioned flange of the said channel-section constitutes the said base of the support means, and the linking portion of the channel-section between the two flanges of the channel-section, constitutes the said upstanding shielding portion positioned ahead of the element relative to the movement between the crop and the element in operation.

In an alternative convenient arrangement according to the invention, the said support means comprises a right-angle section support member, each crop engaging element being secured to one flange of the angle-section with the said base portion of the arms of the element on the inner side of the said flange, the said abutment region of the support means being provided on the inner surface of the other flange of the angle-section. Conveniently the first-mentioned flange of the angle-section constitutes the said base of the support means, and the second-mentioned flange of the angle-section constitutes the said upstanding shielding portion positioned ahead of the element relative to movement between the crop and the element.

The invention finds particular but not exclusive application where the said elements are made of stiff resilient material, for example synthetic plastics material, conveniently nylon, polypropylene or polyurethene, or of spring steel, although rigid non-resilient material may be used. Conveniently the elements may be cut from sheets of plastics material.

The crop engaging device finds application either when in the form of a vertical or horizontal rotor for conveying and/or conditioning crop by rotation of the rotor, or when in the form of a stationary device positioned adjacent a crop flow so as to condition crop being propelled past the device by other means. Where the crop engaging device is in the form of a rotor, the elements may be returned after yielding to their undeflected dispositions by a combination of the yielding arrangements described, aided also by centrifugal force, and where the crop engaging device comprises a stationary device, the elements may be returned to their undeflected dispositions after yielding by means only of the biasing arrangements described. In general, a crop engaging device according to the invention finds application in arrangements such as described in our published pending UK Patent Application No. 8012426 (EX PCT/GB No. 79/00053), where the crop engaging elements of the present invention may replace the brush tufts disclosed in that specification.

Crop engaging devices embodying the invention may be provided which are applicable to conditioning, tedding, turning, scoring, fibrillating, threshing or otherwise treating crops.

The present invention provides, at least in preferred embodiments thereof, a number of advantages over previously known crop engaging elements for conveying and/or conditioning crop. Although the crop engaging elements of the invention may be produced from other materials such as steel, it is particularly preferred that the elements are made of synthetic plastics material, and the invention affords a particularly simple and inexpensive construction. Such elements of plastics material have the attractions of lightness, cheapness, low risk of damaging following machinery if lost, and have a much less complex method of mounting than has been used previously.

In preferred embodiments the invention provides a divergent, two-arm element located and prevented from turning by abutment regions and secured by a single bolt so that fore and aft movement of the element is possible and the arms themselves can twist or deflect laterally.

There have been described hereinbefore a number of optional and preferred features of the present invention, and there will now be set out two particularly preferred forms of the invention in which a number of these preferred features are combined together.

In a first preferred form of the invention there is provided a crop engaging device comprising: support means including a rotor and frame means for mounting said rotor for rotation and for movement along the ground; a plurality of outwardly extending crop engaging elements secured to the rotor for engaging crop in a crop flow during rotation; each crop engaging element having a base portion adapted for securement to the rotor, and a crop engaging portion extending outwardly from the rotor into the crop flow and inclined relative to the rotor in a plane generally transverse to the direction of movement of the crop engaging portion, said element being formed as two outwardly extending arms which diverge from each other in the outward direction and in a plane generally transverse to the direction of movement of the arms, the arms being secured to the support means at the region of conjunction of the two arms, said rotor comprising a plurality of support members each having a base portion and an upstanding shielding portion, said upstanding shielding portion being arranged in front of the base portion of the crop engaging element relative to the direction of movement of the crop engaging element, each element base portion being secured to one of the said support members by an axial fastening means having a principal axis along which it extends through the support member to secure the element thereto, said axial fastening means extending substantially radially relative to the rotor through the base portion of the associated support member, the support members and each crop engaging element having cooperating abutment regions such as to at least inhibit rotation of the crop engaging element away from its required operating position under normal load conditions, but such as to allow the crop engaging element to be yielding under an abnormal load by movement of the crop engaging portion rearwardly in relation to direction of movement of the element, the leading surface of the crop engaging element abutting against the trailing surface of the upstanding flange of the support member so as to prevent or inhibit rotation of the element about the axis of the axial fastening means, but such as to allow the crop engaging element to be yielding in operation by movement of the arms of the element rearwardly away from the upstanding flange of the support member, and the mounting of each element being such that the retaining force in the axial fastening means retaining the element during yielding is predominantly tension along the said axis of the fastening means.

In a second preferred form of the invention there is provided a crop engaging device comprising: support means including a rotor and frame means for mounting said rotor for rotation and for movement along the ground; a plurality of outwardly extending crop engaging elements secured to the rotor for engaging crop in a crop flow during rotation; each crop engaging element having a base portion adapted for securement to the rotor, and a crop engaging portion extending outwardly from the rotor into the crop flow and inclined relative to the rotor in a plane generally transverse to the direction of movement of the crop engaging portion, said element being formed as two outwardly extending arms which diverge from each other in the outward direction and in a plane generally transverse to the direction of movement of the arms, the arms being secured to the support means at the region of conjunction of the two arms, said rotor comprising a plurality of support members each having a base portion and an upstanding shielding portion, said upstanding shielding portion being arranged in front of the base portion of the crop engaging element relative to the direction of movement of the crop engaging element, each element base portion being secured to one of the said support members by an axial fastening means having a principal axis along which it extends through the support member to secure the element thereto, said axial fastening means extending substantially tangentially relative to the rotor through the said shielding portion of the associated support member, the support members and each crop engaging element having cooperating abutment regions such as to at least inhibit rotation of the crop engaging element away from its required operating position under normal load conditions, but such as to allow the crop engaging element to be yielding under an abnormal load by movement of the crop engaging portion rearwardly in relation to direction of movement of the element, the rear surface of the upstanding shielding portion of the support member being utilised to provide at least one of the said abutment regions for at least inhibiting rotation of the crop engaging element away from its required operating position, and the mounting of each element being such that the retaining force in the axial fastening means retaining the element during yielding is predominantly tension along the said axis of the fastening means.

In accordance with yet another aspect of the present invention, the invention provides a method of mounting rigid and semi-rigid crop engaging elements in such a way that they are damage protected by being able to pivot in at least one plane in response to an excessive tip load and automatically returned to their original position, with the mounting and securing means essentially protected from contact with the crop.

INTRODUCTION OF DRAWINGS

Embodiments of the invention will now be described by way of examples with reference to the accompanying drawings in which:

FIG. 3 is a plan view from above of a support means for supporting a crop engaging element which may be of the form shown in FIGS. 1 or 2;

FIG. 3a is a perspective view from the rear of the support means shown in FIG. 3;

FIG. 3b is a side view of the support means of FIGS. 3 and 3a, taken in the direction indicated at X;

FIGS. 4 and 4a show a modification of the support means of FIGS. 3 and 3a and show a plan view from above and a rear perspective view, respectively;

FIGS. 6b and 6c are perspective views of a crop conditioning and or conveying rotor having conditioning elements as shown in FIGS. 6 and 6a;

FIGS. 7 and 7a are a rear perspective view and side view respectively of a modification of the embodiment of FIGS. 6a and 6b;

FIGS. 8 and 8a are a rear perspective view and side view respectively of a further modification of the embodiment of FIGS. 6 and 6a;

FIGS. 9 and 9a are a rear perspective view and side view respectively of a modification of the embodiment of FIGS. 8 and 8a;

Figure 13:
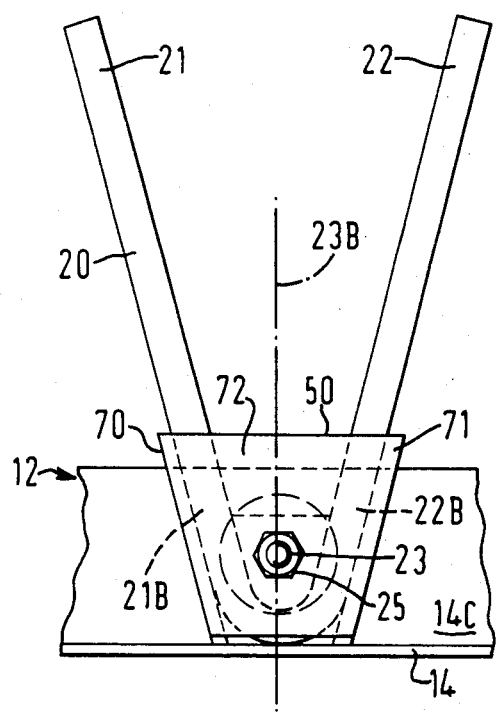
Figure 13A:
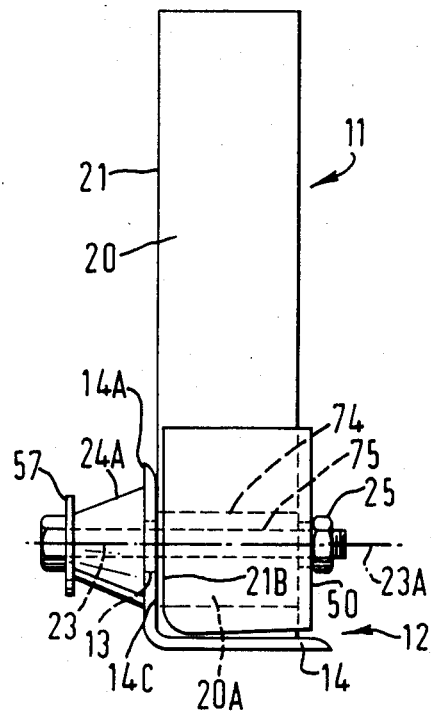
Figure 13B:
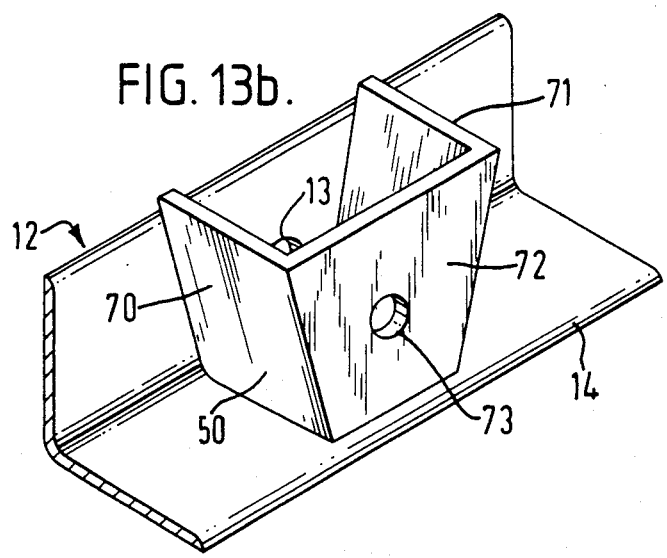

FIGS. 13 and 13a are a rear perspective view and side view respectively of a further modification of the embodiments shown in previous figures, and FIGS. 13b and 13c show perspective detail views of a bracket and a packing piece, respectively, also shown in FIGS. 13 and 13a.

Figure 12:
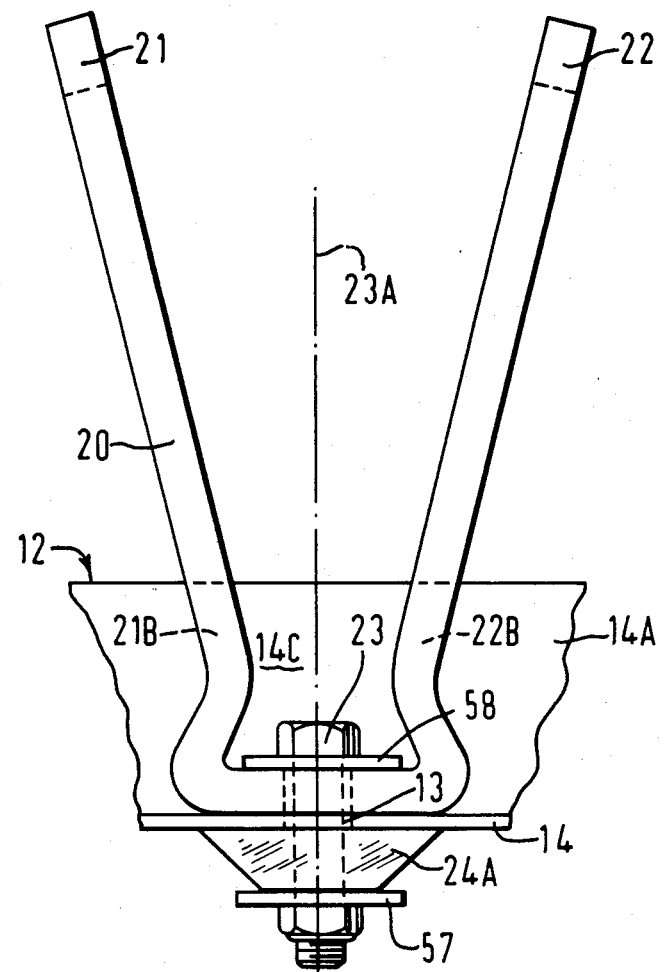
FIG. 12 is a rear perspective view of a crop engaging element embodying the invention in which a crop engaging element is secured to a transverse support member by a bolt passing through the element, the support member, and a resilient biassing block.
Figure 16:
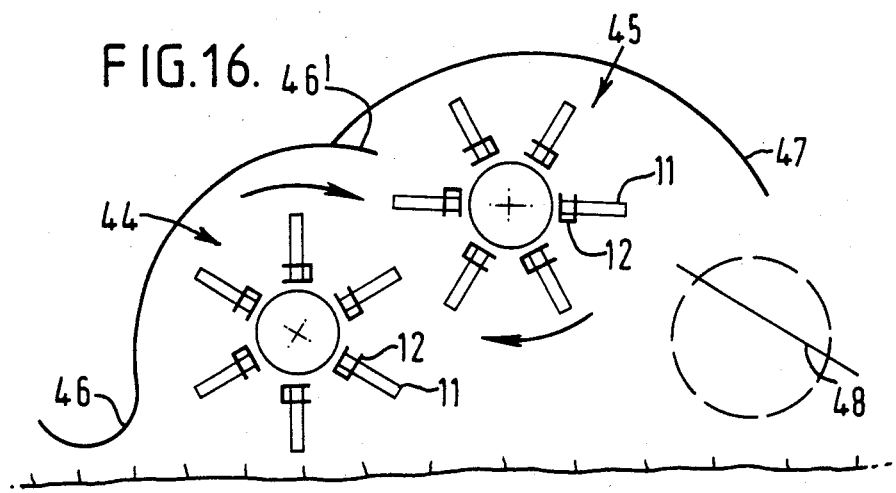
Figure 15:
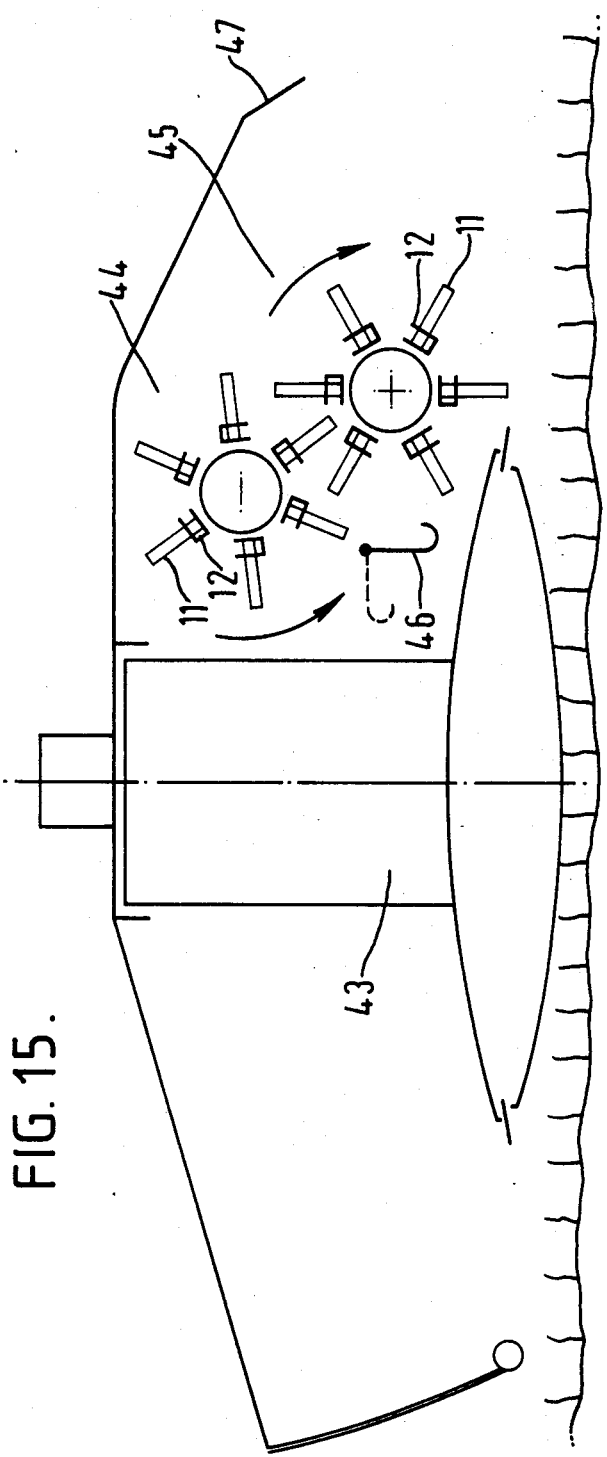
Figure 17A:
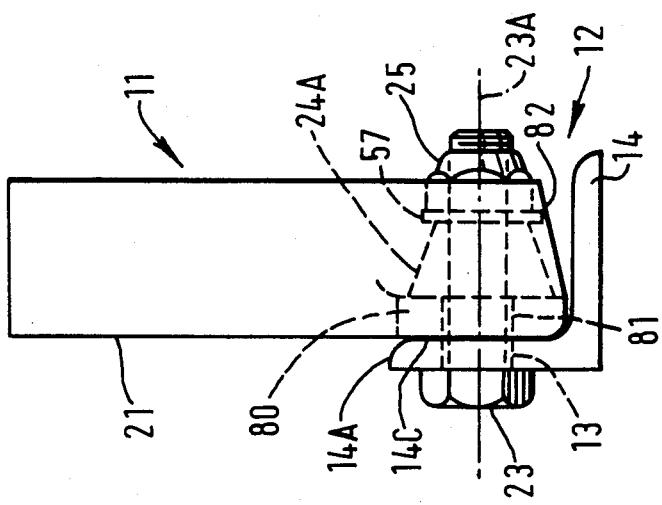
Figure 17:
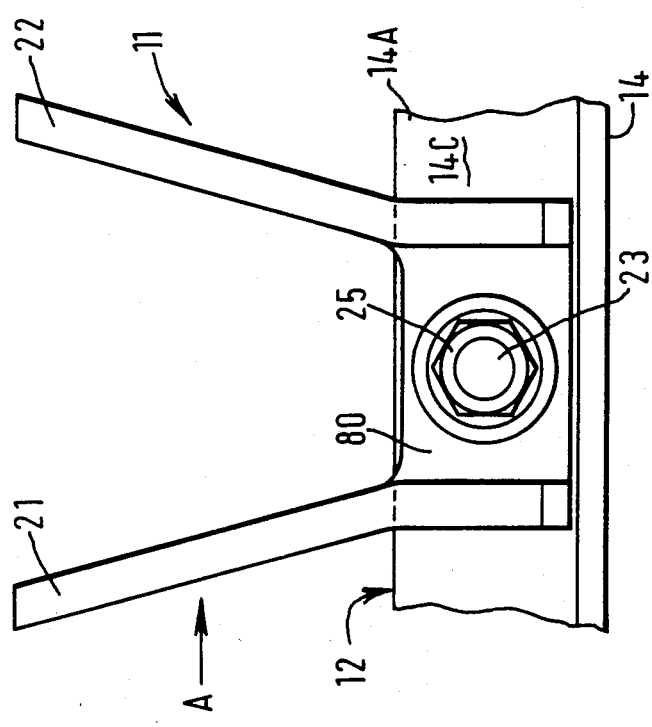
Figure 18A:
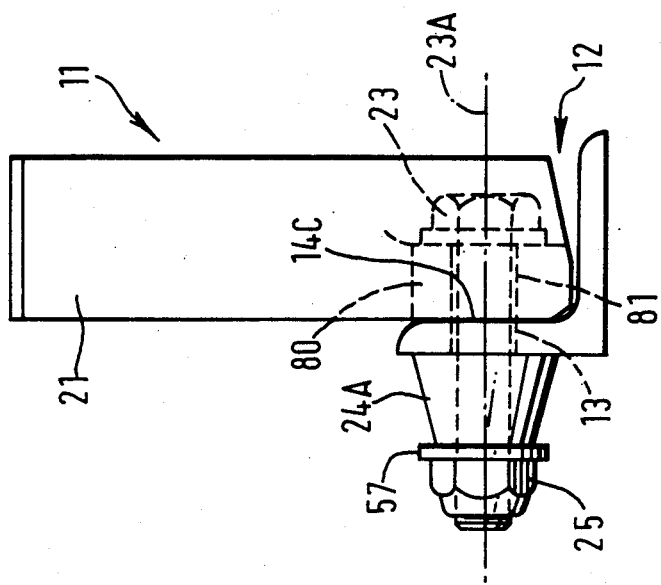
Figure 18:
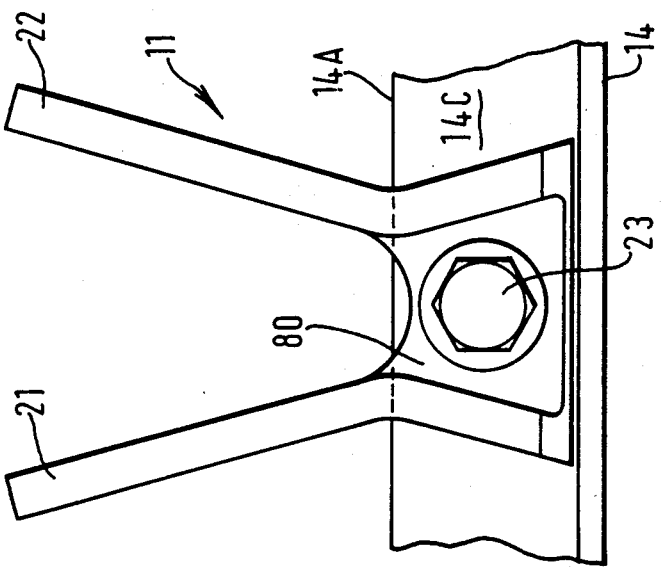

FIG. 14 shows a diagrammatic side view partly in section of a crop conditioning rotor fitted to the rear of a disc mower;

FIG. 14a shows a detail perspective view of a restrictor plate forming part of the apparatus of FIG. 14;

FIG. 14c shows a development of a mounting pattern of a number of conditioning elements around a conditioning rotor;

FIG. 15 shows a diagrammatic side view of a drum mower fitted with two crop conditioning rotors including crop conditioning elements embodying the invention; and FIG. 16 shows a diagrammatic side view of a pickup conditioner fitted with an alternative arrangement of crop conditioning rotors including crop conditioning elements embodying the invention;

FIG. 17 and 17(a) are a rear perspective view and side view respectively of a modification of the embodiment of FIG. 12;

FIGS. 18 and 18(a) are a rear perspective view and side view respectively of a modification of the embodiment of FIG. 12; and FIGS. 19 and 19(a) are a rear perspective view and side view respectively of a modification of the embodiment of FIG. 12.

Figure 2:
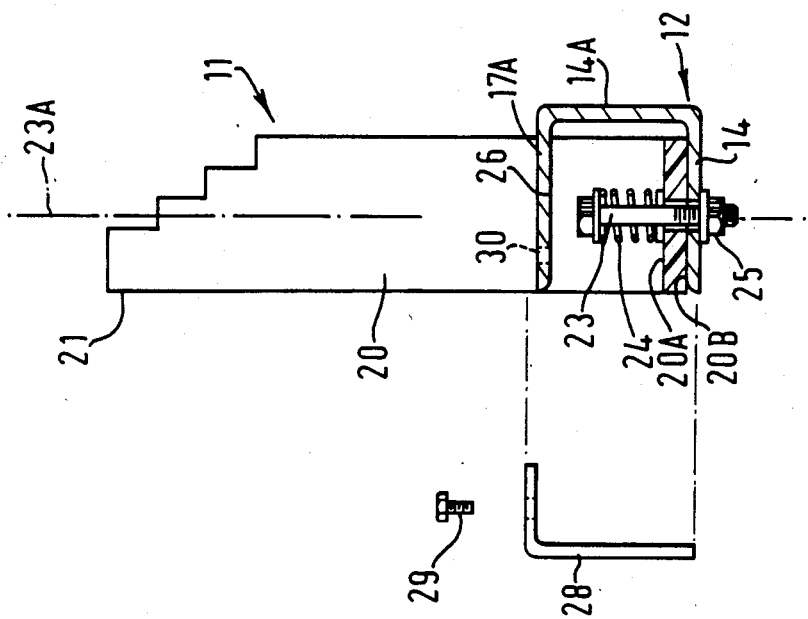
FIG. 2 is a side view partly in section taken along the line AA in FIG. 1.
Figure 1:
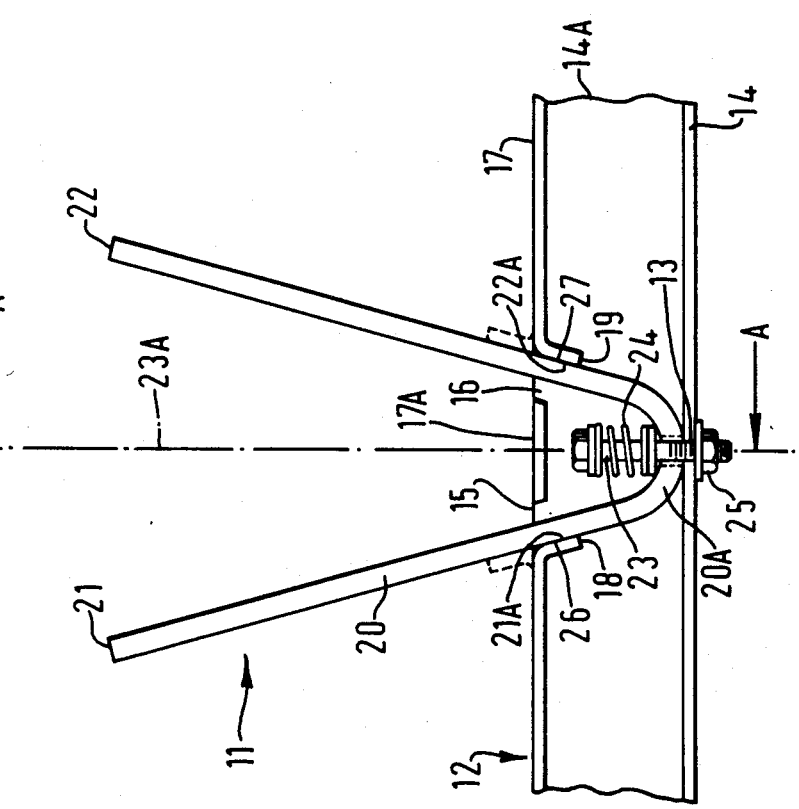
FIG. 1 is a rear perspective view of a crop engaging element embodying the invention.

Referring firstly to FIGS. 1 and 2 there is shown a crop engaging element for conveying and/or conditioning crop, indicated generally by the reference 11, and forming one of a plurality of such elements mounted on a rotor having a plurality of transverse support members parallel to the axis of the rotor, of which one is indicated generally by the reference 12.

The support member 12 comprises a channel-section support member having an opening 13 in a first base flange 14 of the channel-section, and having two slot-shaped openings 15 and 16 in the second, upper flange 17 of the channel-section member 12. The slots 15 and 16 are formed by appropriate cuts in the upper flange 17, and by folding downwardly or upwardly lips 18 and 19 cut from the upper flange 17. The support member 12 has a leading upstanding portion 14A, which links the base flange 14 and the return flange 17.

The crop engaging element 11 comprises an elongate member in the form of a flat strip 20 of stiff resilient material, conveniently a strip of synthetic plastics material. For example the flat strip 20 may be cut from a sheet of polypropylene of 10 mm thickness, the strip being for example 5 cm in width and the entire strip 20 being 25 cm in length.

As shown in FIG. 1, the flat strip 20 is folded, by heating if necessary, to form two outwardly extending arms 21 and 22 generally in the form of a V-shape, and is secured to the base flange 14 of the channel-section support member 12 by a bolt 23 passing through the opening 13 in the flange 14 and a slightly larger hole adjacent in the plastics material, to allow a degree of relative movement. The bolt 23 extends along a principal axis 23A of the bolt. The bolt 23 retains the strip 20 in place by means of a compression spring 24, the bolt 23 being secured by a nut 25 on the outer side of the base flange 14.

The arms 21 and 22 of the element 11 diverge from each other in the outward direction away from the support member 12, and pass through the openings 15 and 16 in the upper flange 17 of the channel-section member 12. The arms 21 and 22 are biased apart by virtue of the outwardly directed springiness of the material of the strip 20, and bear against the inner surfaces 26 and 27 of the bent-over lips 18 and 19. The lips 18 and 19 form guides for the arms 21 and 22, as will be explained hereinafter, and the surfaces 26 and 27 form guide surfaces. The guide surfaces 26 and 27 retain the arms 21 and 22 in the V-shape configuration against the bias urging the arms apart.

The guide surfaces 26 and 27 provide an abutment region on the support member 12, and the outer side surfaces (indicated at 21A and 22A) of the arms 21 and 22 next to the guide surfaces 26 and 27, provide an abutment region on the crop engaging element 11. These cooperating abutment regions prevent or inhibit rotation of the element 11 about the bolt 23.

Turning to FIG. 2, it will be appreciated that the guide surfaces 26 and 27 have a further function of guiding a yielding movement of the crop engaging element 11 which may take plate during operation. For example, in FIG. 2 the sense of rotation of the crop engaging rotor will be such as to move the support member 12 to the right, so that the crop engaging element 11 conveys crop towards the right. Should the element 11 meet with a stone, piece of tramp metal, or like foreign object in the crop, the element 11 is not free to rotate about the axis 23A of the fastening bolt 23 but is free to pivot rearwardly by a rocking movement of the base, or fold (indicated at 20A), of the strip 20 on the base flange 14 of the channel-section member 12, by means of compression of the spring 24. This rocking movement may be the sole yielding movement of the crop engaging element 11, or there may in addition be some movement of the element 11 due to yielding of the element by virtue of the resilience of the material from which it is made. It is also to be noted that the arms 21 and 22 may be deflected in the plane of FIG. 1, that is to say from side to side, in addition to the rearward yielding of the element. Furthermore, the yielding of the element may also be produced by excess load conditions due to a particularly dense crop, in addition to yielding to avoid foreign objects.

Predominantly, the yielding movement of the element 11 will be about an axis transverse to the axis 23A of the bolt 23. The rocking movement of the element 11 will not of course take place about a clearly defined axis, but where the whole element tips rearwardly the movement may be regarded approximately as a pivoting movement about an axis parallel to the member 12 at the rear of the base portion 20A in the general region indicated at 20B. It is to be appreciated that in practice, especially where the strip 20 is formed of resilient plastics material, the yielding movement will not be a simple pivoting movement but will include a twisting and deforming of the arms 21 and 22. Indeed in some embodiments to be described hereinafter the base portion 20 may be fixed rigidly to the base flange 14, so that all the yielding movement takes place by virtue of the resilience of the arms 21 and 22. However such movement also takes place about an axis transverse to the axis 23A of the bolt 23, even though the axis about which the yielding movement takes place may not be definable, and may move during the yielding movement. Also of course the transverse axis about which the yielding movement takes place need not be parallel to the support member 12.

The embodiment shown in FIGS. 1 and 2 is particularly suitable for use where the element 11 is formed from metal, or other material which is not particularly yielding in itself, since the yielding can be provided by the spring 24. It is also to be noted that the angled lips 18 and 19 reduce wear from chafing by virtue of their broad bearing surface. As an alternative the lips 18 and 19 could be bent upwardly as shown in dotted lines in FIG. 1. The mounting spring 24 could be replaced by a rubber bush or block with a covering washer as shown in later figures. Such a modification has the advantages that the rubber moulds itself to the lower contour of the element and is non-corrosive. To guard against loss of the element 11, for example if the mounting bolt 23 should fail, a narrow right-angle bracket shown in FIG. 2 at 28 may be provided and may be secured by a small bolt 29 passing through an aperture 30 in the flange 17 of the channel-section member 12. The bracket 28 may for example be 20 mm wide, so as not to interfere with free yielding movement of the element 11.

To increase the conditioning effect of the elements, the tip portions may be stepped, as shown in FIG. 2, or otherwise made rough.

Turning now to FIGS. 3, 3a and 3b, there is shown an alternative form of providing the guide surfaces 26 and 27. In FIGS. 3, 3a and 3b elements corresponding to elements in FIG. 1 will be indicated by like reference numerals. In FIGS. 3, 3a and 3b the crop engaging element 11 has been omitted for simplicity.

In FIGS. 3, 3a and 3b, a right-angle section supporting member 12 has a first base flange 14 on which the crop engaging element is mounted by means of a bolt through aperture 13, and a second upstanding flange 14A from which projects a U-shaped guide member 31 which is generally parallel to the base flange 14 of the right-angle section member 12. The guide surfaces 26 and 27 are provided on the inside surfaces of the U-shaped member 31 allowing the crop engaging element to rock rearwardly in the same manner as has been described with reference to FIGS. 1 and 2. However, the trailing part of the U-shaped member 31, parallel to the upstanding flange 14A, limits the angle to which the crop engaging element is able to pivot to the rear.

FIGS. 4 and 4a show a further modified embodiment and correspond generally to the views shown in FIGS. 3 and 3a. In FIGS. 4 and 4a the guide surfaces 26 and 27 are provided on inner facing surfaces of two separate dowels 32 and 33 which project rearwardly from one flange 14A of an angle-section support member 12.

In the case of all three embodiments described so far, the support member 12 comprises a base portion 14 on which the crop engaging element 11 is mounted, and a shielding portion 14A which leads the crop engaging element 11 in operation, and protects the base of the element 11 from damage from foreign objects.

If it is required to guard against loss of a crop engaging element in the embodiments of FIGS. 3 to 4a, a U-shaped retaining clip can be provided secured to the flange 14 on either side of the aperture 13.

Figure 5:
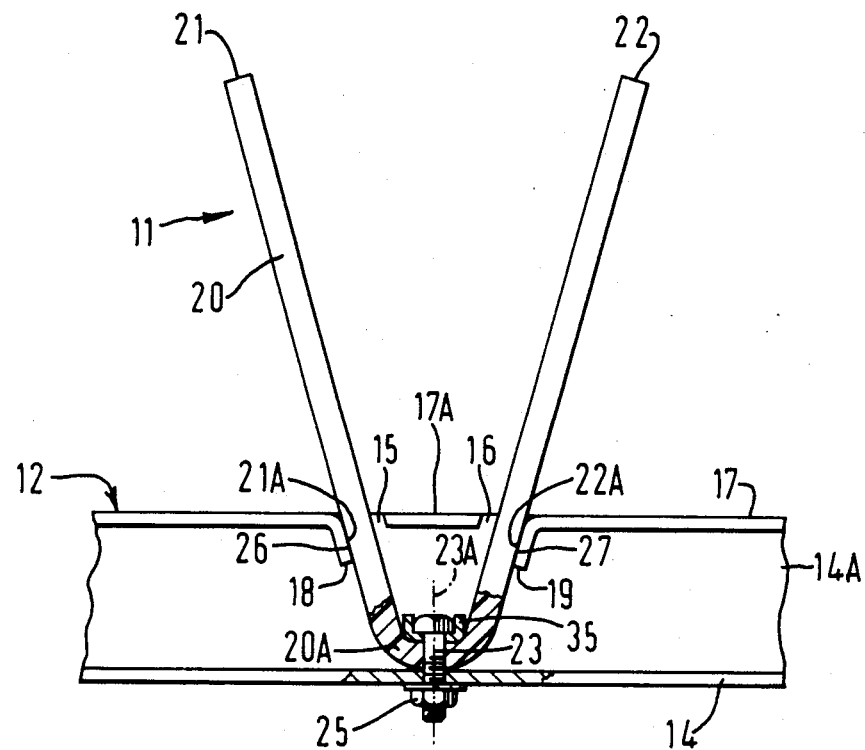
FIG. 5 shows a rear perspective view of an alternative form of crop conditioning element, corresponding generally to the embodiments shown in FIG. 1.

In FIG. 5 there is shown an alternative embodiment which follows generally the embodiments shown in FIG. 1, and like reference numerals are used for corresponding elements. The arrangement shown in FIG. 5 is suitable where the stiff resilient strip 20 is formed of material which is yieldable by virtue of the its own resilience, for example synthetic plastics material, and in such a case the spring 24 of FIG. 1 can be omitted. In FIG. 5 the bolt 23 carries a shaped washer 35 and is tightened to hold the strip 20 against the flange 14 of the channel-section support member 12. To prevent the bolt head 23 from turning during fitting or removal, a crimped washer is used beneath it.

Turning now to FIGS. 6 to 10 there are shown various alternative embodiments corresponding generally to those shown in the previous Figures, but in which a resilient elastomeric block is used in place of the spring 24 shown in FIGS. 1 and 2. In these following Figures, elements corresponding to elements in FIG. 1 will be indicated by like reference numerals.

Figure 6A:
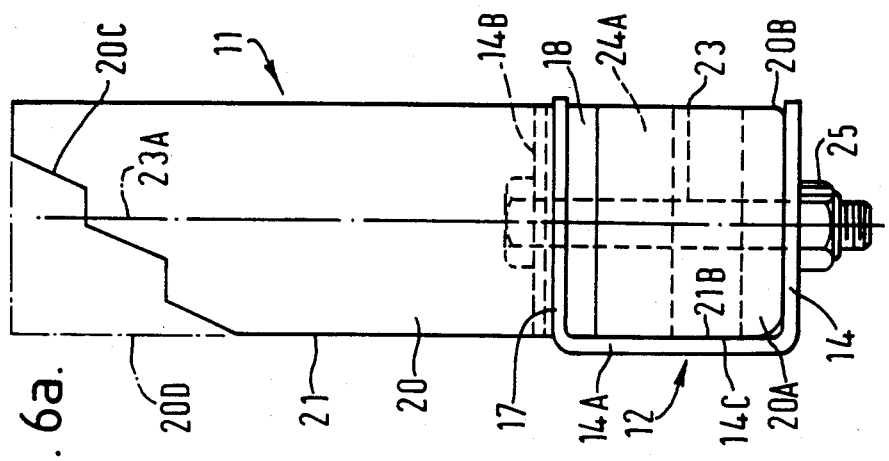
FIGS. 6 and 6a are a rear perspective view and side view respectively of a modification of the embodiments shown in FIGS. 1 and 2.
Figure 6:
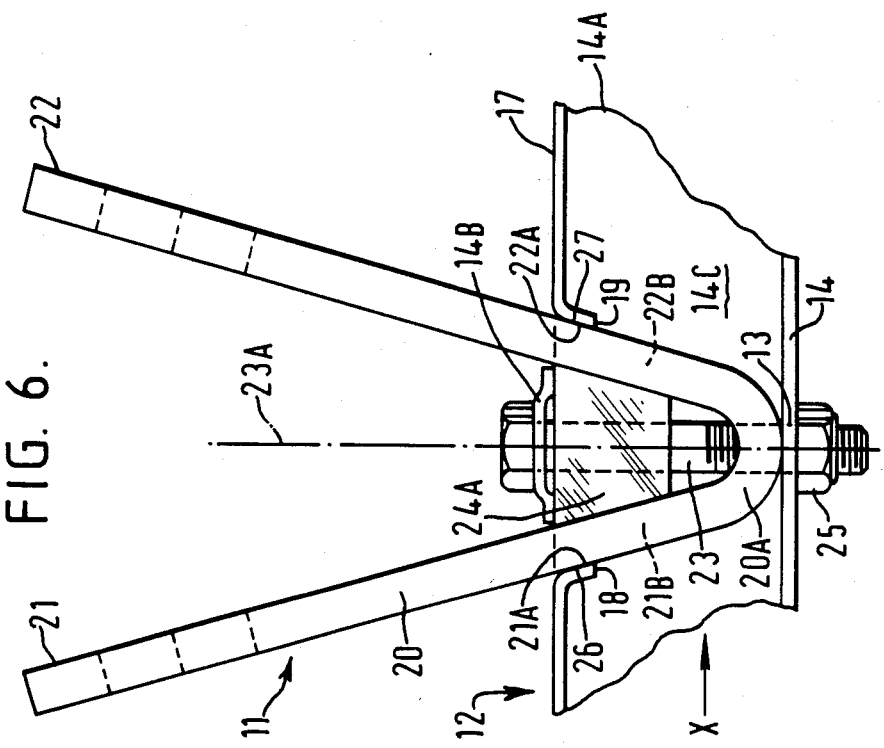
Figure 6B:
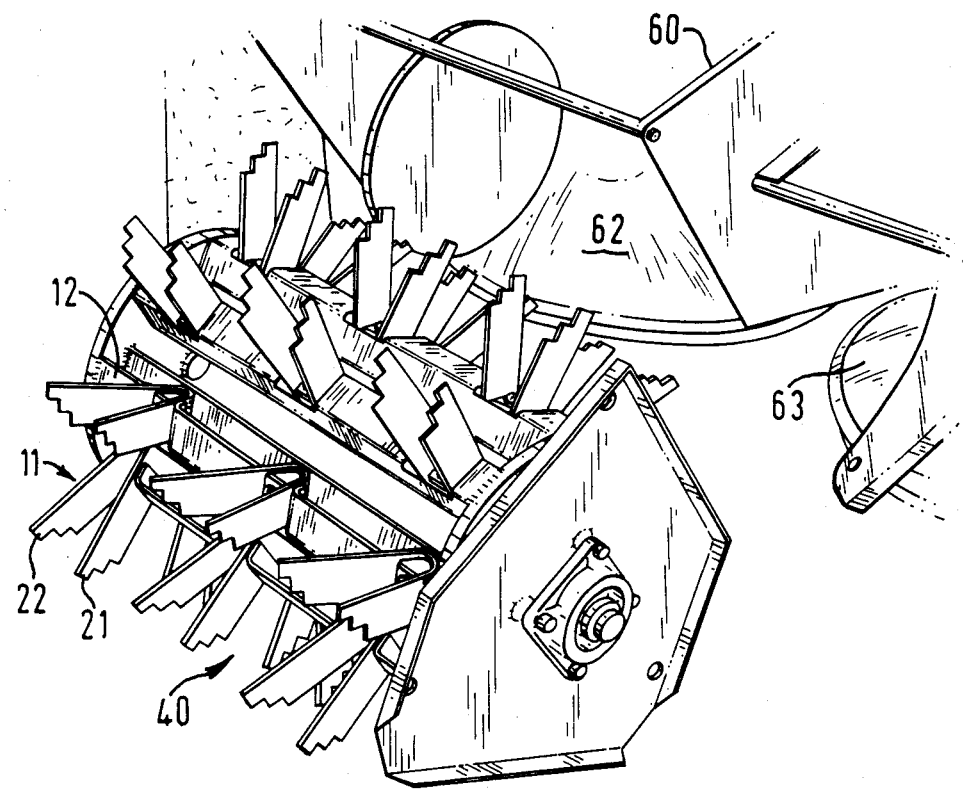

The embodiment of FIGS. 6a and 6b differs from that of FIG. 1 first in that the portion 17A of the upper flange 17 of the support member 12 which in FIG. 1 extends between the diverging arms 21 and 22, is in FIG. 6 removed, and is replaced by an independent plate 14B. Secondly a wedge shaped rubber block 24A is inserted into the space between the two arms 21 and 22. The block 24A is held in place by the bolt 23 which passes through the lower base flange 14 of the support member 12, through the base portion 20A of the element 11, through the block 24A, and through the plate 14B. The block is so dimensioned that, when tightened down and slightly precompressed, it is approximately 15 mm clear of the bottom of the element 11. If the element 11 should be forced back by a load applied to the tips, the rubber of the block 24A can momentarily flow into the void beneath the block 24A and above the fold 20A of the element 11. The plate 14B is a double-crimped rectangular plate, which also provides space in the center section thereof for the rubber to flow into momentarily.

In the embodiment of FIGS. 6 and 6(a), there are provided additional abutment regions on the element 11 and on the support member 12, in addition to the regions on the outer sides of the arms 21 and 22 and on the inner surfaces of the lips 18 and 19. The additional abutment regions are formed on the leading edge surfaces of the arms 21 and 22 (indicated at 21B and 22B), and on the inner surface of the upstanding shielding portion 14A of the channel section member 12 (indicated at 14C). The abutment of the edge surfaces 21B and 22B of the arms 21 and 22, against the inner surface 14C of the channel section member 12, gives additional stabilising of the element 11 to prevent or inhibit rotation of the element 11 about the bolt 23, while allowing yielding of the element 11 by rearward rocking motion of the element 11 about an axis transverse to the principal axis of the bolt 23. In this rocking motion, the abutment regions on the surfaces 14C and 21B, 22B, move apart, whereas the outerside surfaces 21A and 22A of the arms 21 and 22 slide along the guide surfaces 26 and 27 of the lips 18 and 19.

In FIGS. 6 and 6(a) the arms 21 and 22 are shown in full lines as having stepped contours at the ends thereof, indicated at 20C. Alternatively the ends of the arms 21 and 22 may end with an edge at right angles to the strip 20, as shown at 20D.

Figure 6C:
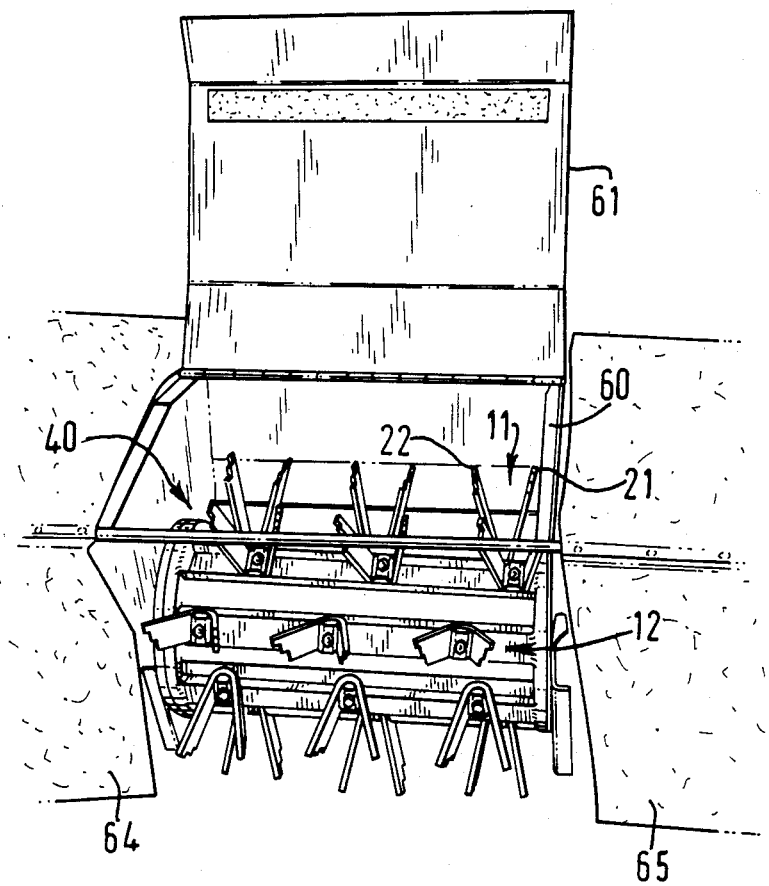

In FIGS. 6(b) and 6(c) there are shown perspective views of a rotor 40 embodying the invention and having an array of conditioning elements 11 as shown in FIGS. 6 and 6(a). In FIG. 6(c) the rotor 40 is shown mounted on a frame 50 with a rear housing 51 lifted up from its normal position to show the rotor 40. FIG. 6(c) is a rear view of the machine. The rotor 40 rotates in such a manner as to lift crop upwardly and rearwardly over the rotor 40, the crop being picked up from the rear of twin cutting rotors which are partly shown in FIG. 6(b) at 62 and 63 and which in FIG. 6(c) are hidden by covers 64 and 65. In FIG. 6(b) the rotor is shown when removed from the rear of the frame 50, for purposes of explanation.

In FIG. 7 there is shown a further modification, in which the conditioning element 11 is secured to a right-angle bar 12, generally in a manner similar to that shown in FIG. 1 and 2, except that the lips 18 and 19 are replaced by a shaped bracket 50 which is secured to the same flange 14 of the support bar 12 as is the conditioning element 11. The bracket 50 is secured by the same bolt 23 which secures the other components. The bracket 50 has side arms 51 and 52 which provide abutment regions of the support means 12 and which hold the element 11 against rotation around the bolt 23, but which nevertheless allow fore and aft pivotting movement of the element 11 by compression of the elastomeric rubber block 24A.

Again, as in FIGS. 6 and 6(a), there are provided further abutment regions on the leading edge surfaces of the arms 21 and 22, and abutment regions on the inner face of the upstanding flange 14A of the right-angle section bar 12.

Figure 8A:
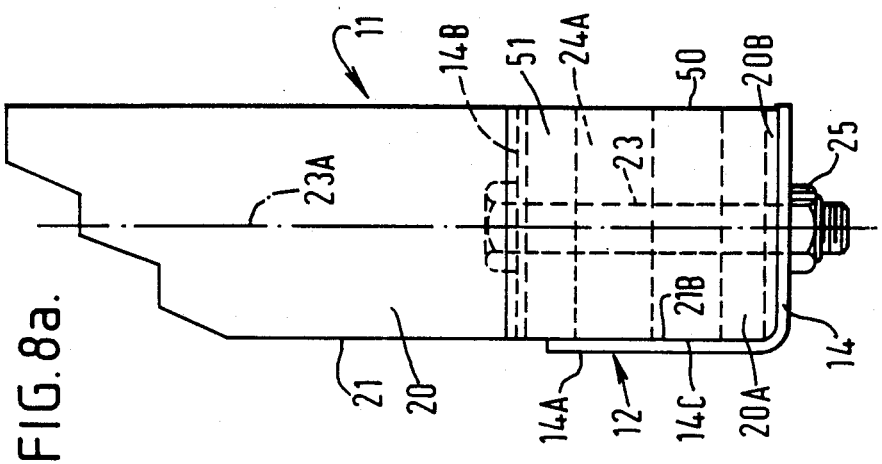
Figure 8:
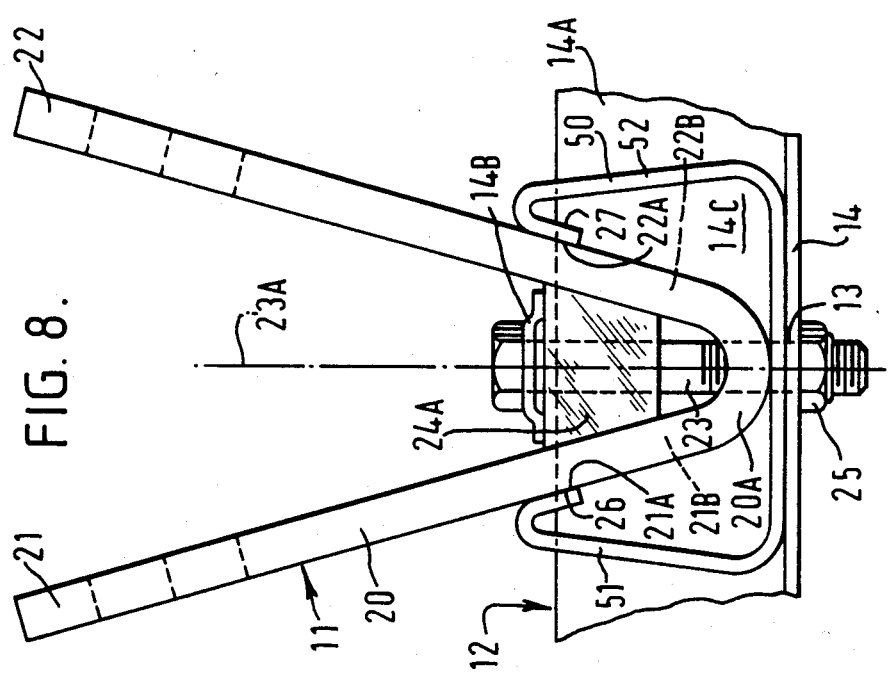

FIGS. 8 and 8a show an arrangement generally similar to that of FIGS. 7 and 7a, except that the support bracket 50 is shaped differently, its base being wider to provide a firm location.

FIGS. 9 and 9a show a further arrangement in which the inner lugs 53 and 54 are longer than in FIG. 8, so that they reach the base of the bracket 50. Optionally these lugs 54 and 53 may be secured in position by spot or seam welding. With welded lugs the bracket is extremely rigid laterally.

Figure 10:
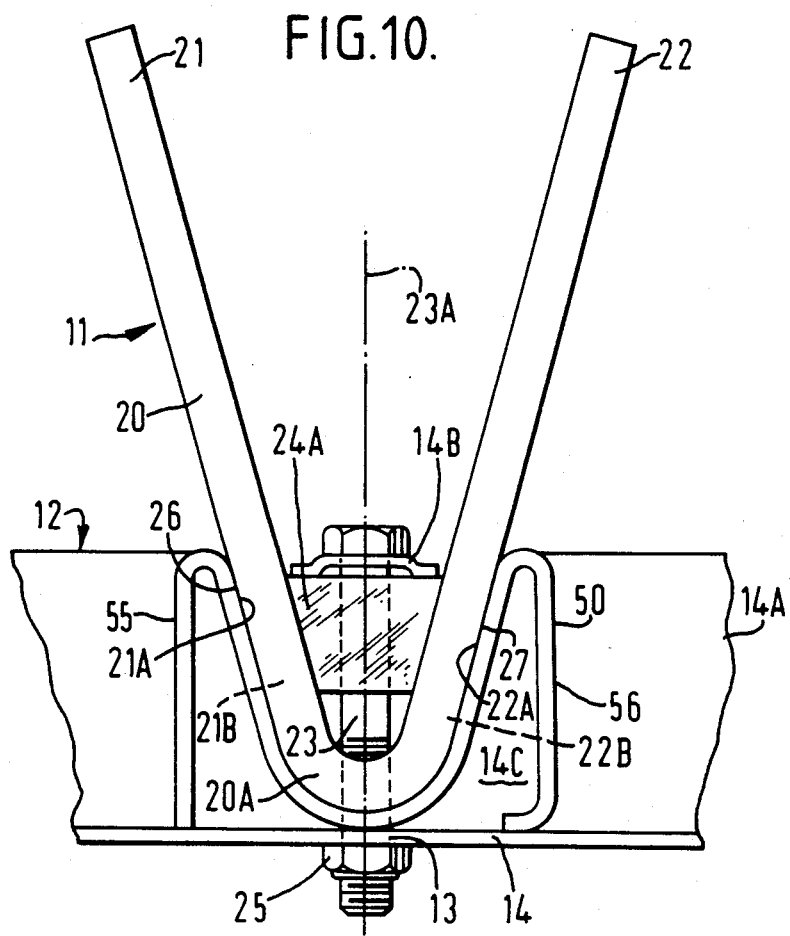
FIG. 10 is a rear perspective view of a further modification of the embodiment of FIG. 9.

FIG. 10 shows a further modification. In this the bracket 50 is M-shaped. The two legs 55 and 56 of the "M" may be straight, as shown on the left of FIG. 10, or bent over, as shown on the right of FIG. 10. In the latter case, splaying of the legs is more likely to be prevented when a force acting on the tips of the crop engaging element 11 tends to force the arms 21 and 22 apart.

Figure 11:
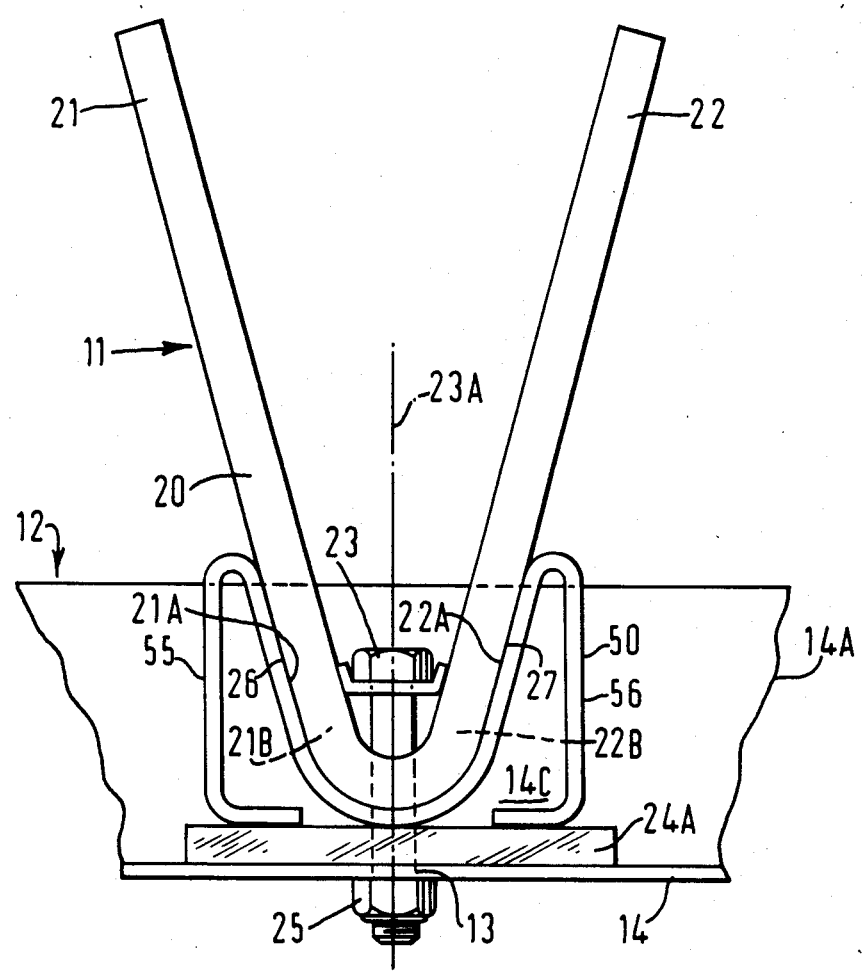
FIG. 11 is a rear perspective view of a crop engaging element embodying the invention, in which a bracket supporting the conditioning element rests directly on a rubber mounting pad.

In FIGS. 11 and 12, there are shown two further modifications, which provide impact protection for the conditioning element 11 through resilient mounting. In FIG. 11 an M-shaped bracket 50 with inwardly curving legs 55 and 56 rests on a rectangular rubber cushion 24B which is sandwiched between the bracket 50 and the base flange 14 of the right-angle bar 12. In response to a tip load at the front of the conditioning element 11, the bracket 50 can tilt about the central mounting bolt 23 so that the edges of the bracket 50 in contact with the rubber 24B momentarily displace some of the rubber, particularly at the rear corners.

In the arrangement of FIG. 12, a flat based two-armed element 11 made from rigid material is secured perpendicularly, or near perpendicularly, to a right-angle mounting bar 12 by a bolt 23 passing through the base of the element 11, the mounting bar 12, a rubber block 24A (conveniently cone-shaped), and washers 57 and 58. As in other embodiments, the crop engaging element 11 is able to rock to the rear in response to heavy tip loads. In the embodiments of FIGS. 11 and 12, the element 11 is also able to rock from side to side. However the element 11 is unable to swivel about the axis of the bolt 23 because of the close proximity of the leading edges of the conditioning element 11 to the upstanding web 14' of the angle bar, and by its width at the base in relation to the degree of freedom allowed by the resilient component. The resilient component may be a rubber bush, block or cone as shown, but may also be a steel spring. Where appropriate, the resilient interface shown in FIG. 11 may be combined with a further resilient element as shown in FIG. 12.

In the embodiments of FIGS. 11 and 12, the leading edges of the crop engaging element 11, in the region of the base thereof, provide abutment regions on the crop engaging element, and the inner face of the upstanding web 14A provides an abutment surface on the support means 12. In FIG. 11, the bracket 50 also acts to prevent rotation about the axis of the bolt 23, in that the leading edge of the bracket 50 may also be arranged to abut against the inner surface of the upstanding web 14A.

In FIGS. 13, 13(a), 13(b), and 13(c) there are shown various views of a further alternative embodiment of the invention. As before, components in FIGS. 13 to 13(c) which correspond to components in previous figures, are indicated by like reference numerals.

The embodiment of FIGS. 13 to 13(c) has a number of significant differences from the previous examples, although the overall purpose of the embodiment and manner of functioning are substantially the same. First, the bolt 23 does not pass through a hole in the base portion 20A of the element 11, but instead passes through the region of the fold of the strip 20 and through the upstanding shielding flange 14A of the support member 12. The element strip 20 is supported in the required inclined configuration by a bracket 50 which is shown in detail in FIG. 13(b). The bracket 50 comprises side flanges 70 and 71 positioned at right angles to the inner surface 14C of the upstanding flange 14A of the support member 12, but inclined upwardly and outwardly relative to the base portion 14 of the support member 12. The bracket 50 has a rear linking portion 72 which is parallel to the upstanding flange 14A of the support member 12 and joins together the two side flanges 70 and 71. The rear portion 72 has an aperture 73 through which the bolt 23 passes, to secure the bracket 50 and arms 21 and 22 to the support member 12.

Inside the bracket 50 is positioned a packing piece 74, shown in detail in FIG. 13(c), which fits inside the fold of the strip 20. The packing piece 70 has an aperture 75 through which the bolt 23 passes. The packing piece retains the folded strip 20 in the bracket 50 against forces acting outwardly from the base portion 14 of the support member 12, for example centrifugal forces when the support member 12 forms part of a rotor. Conveniently the packing piece 74 is made of hard rubber although metal may be used. Preferably the strip 20 is made of stiff resilient synthetic plastics material, although metal may be used.

On the other surface of the flange 14A is positioned a rubber cone 24A through which the bolt 23 passes, the bolt being provided with a washer 57. The bolt is normally slightly pretensioned against the rubber block 24A to hold the element 11 against the flange 14A in the required operating position.

In operation the arms 21 and 22 are prevented, or inhibited, from rotating, under normal crop loads, about an axis 23B (which passes through the bolt axis 23A at right angles thereto perpendicular to the base portion 14 of the support member 12) by the effect of abutment regions on the leading edges 21B and 22B on the arms 21 and 22, cooperating within the inner rear surface 14C of the upstanding flange 14A. When the element 11 is affected by an abnormal load, the element tips rearwardly as has been described with reference to earlier embodiments, by compression of the rubber cone 24A. During such yielding movement, the bolt 23 is predominantly under tension, generally along the axis of 23 of the bolt.

One advantage of the arrangement shown in FIGS. 13 to 13(c) is that the bolt 23 does not actually pass through a hole in the strip 20, so that weakening of the strip 20 by the hole is avoided. Also the linking portion 72 of the bracket 50 gives support to the rear edges of the arms 21 and 22 at the back region thereof.

Considering the embodiments of FIGS. 1 to 5, it is to be noted that the position of the hole 13 and securing bolt 23 towards or away from the leading shielding wall 14A of the support member 12 determines how easily the element is rocked fore and aft by an excessive load applied near the tips of the element 11. If the securing bolt is fitted near the leading edge of the folded strip 20, then the element 11 itself will resist rearward deflection more than if the bolt is located nearer the trailing edge of the folded strip 20.

It is also to be noted, with regard to several embodiments described so far, that where a bracket 50 is provided, the bracket may (in some arrangements), during yielding movement, move wholly or predominantly with the crop engaging element 11, or may (in some arrangements) remain wholly or predominantly stationary relative to the support means 12. Where the bracket 50 is arranged to move wholly or predominantly with the crop engaging element 11 during the said yielding movement, abutment regions may be provided by the leading edge surfaces of the bracket 50, which may be arranged to abut against the inner surface 14C of the upstanding flange 14A of the support means 12. Thus although it will normally be arranged that the leading edge surfaces of the folded strip 20 abut against the inner surface of the upstanding flange 14A, this may not necessarily be the case, and the effective abutment region of the crop engaging element may be provided on the bracket 50. In some circumstances for example, the elongate member 20 from which the arms 21 and 22 are formed, may be bonded or otherwise fixed to the bracket 50.

In other arrangements the strip 20 from which the arms 21 and 22 are formed may be arranged to move relative to the bracket 50 during the yielding movement. Indeed in some arrangements it may be advantageous to weld or otherwise secure the bracket 50 to the support member 12.

Figure 14B:
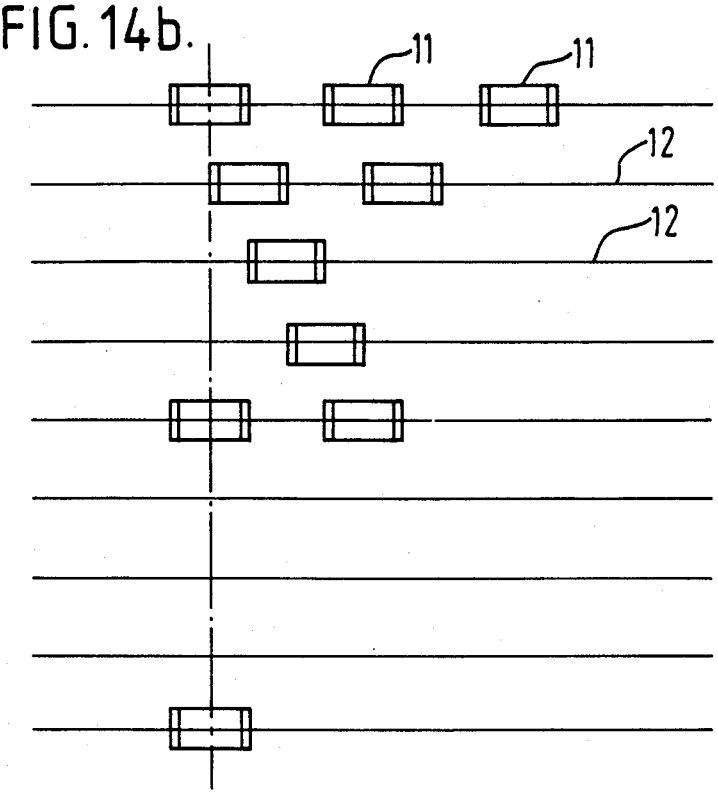

The remaining Figures show various convenient arrangements of crop engaging elements of the form shown in the Figures described thus far. FIG. 14(b) shows part of a mounting pattern in the form of an envelope of a conditioning rotor. On successive support members 12 individual crop engaging elements 11 are so arranged that they overlap the preceding and succeeding elements. The result of this staggered array of V-form elements is that crop cannot easily penetrate to and become wrapped around the rotor center.

FIG. 14 shows diagrammatically in side view a crop conditioning and conveying rotor indicated generally at 40, fitted to the rear of a multi-disc mower indicated generally at 41. A pivotable restrictor plate 42 is provided at the front of the rotor 40 on the underside of the hood of the apparatus, and one example 42A of such a plate is shown in more detail in FIG. 14a to have sharp serrations at the upper edge. The restrictor plate 42 forces the crop into the conditioning rotor 40 and also conditions the upper part of the crop layer being drawn into the rotor housing by a scraping action of the teeth. The set clearance between rotor and restrictor plate determines the severity of conditioning; the closer the setting the greater the conditioning effect. In an alternative arrangement, the restrictor plate 42 may have mounted thereon an array of conditioning elements 11 of the form described with reference to any of the preceding Figures.

FIG. 15 shows a drum mower 43 fitted with two smaller diameter intermeshing conditioning rotors 44 and 45 driven in counter rotation at identical speed. At the front a pivotable plate 46 guides the crop into the lower rotor 45 and prevents the crop from being thrown forwardly by the action of the rotor. For heavy crops which require more space to flow freely, the front guide plate 46 can be pivotted forwardly and upwardly. After the crop has passed between the conditioning rotors 44 and 45, it is formed into a windrow by the rearwardly extending rotor cover 47. Distinct advantages of the counter-rotating two-rotor conditioning system are (i) the crop layer is treated with equal severity from the top and bottom, and (ii) many of the thick lower stems of the crop are deposited in the swath on top where they are most accessible to the drying air and sun.

FIG. 16 shows an alternative two-rotor system in which rotors 44 and 45 are located one behind the other to rotate in the same direction. Although the system is illustrated as a pick-up conditioner, it may be combined with rotary and linear mowers of all types. Restrictor plates 46 and 46′ may be adjusted so that the housing-to-rotor clearance can be varied; the tighter it is the greater becomes the conditioning effect. In work the crop is conditioned during the initial acceleration by the first rotor 44. On transfer to the second rotor 45 it is spiked during deceleration and further conditioned during renewed acceleration. The rearwardly extending rotor cover 47 slows down the crop and directs it on to an optional baffle plate 48 from which it slides gently on to the ground to be left in a fluffy swath. With appropriate adjustments the system is capable of causing very severe conditioning particularly suited to rapid wilting in difficult climatic conditions.

As an alternative to the sloping baffle plate 48 a freely rotating or lightly braked drum, as shown in broken outline, may be fitted, to place the crop gently on to the ground without risk of accumulation.

With all the conditioner embodiments disclosed suitable speeds at the tips of the conditioning elements range from 15 to 30 m/s, preferably 20 to 25 m/s.

Referring now again to the embodiments of FIGS. 2 and 6a to 9a, attention is drawn to the stepped and raked-backed leading edges of the two arms of the crop engaging elements. An advantage of this design is that the abrasiveness of the tip regions is increased, and the tendency for crop to "hairpin" is greatly reduced. As a result of the latter, crop leaves a conditioning rotor cleanly, and none is driven hard into the stubble where it can obstruct the inflow of air beneath the swath. It is to be appreciated that this feature of the stepped and raked-back leading edges of the diverging arms of a crop engaging element of this form, provides an independent inventive aspect of the present invention, independently of the form of resiliently mounting or otherwise which may be used.

Three further embodiments of the invention will now be described with reference to FIGS. 17 to 19(a), which show particularly preferred modifications of the devices shown in FIG. 12 and 13. These embodiments are suitable where the element is produced by moulding from synthetic plastics material, to produce a relatively rigid, but resilient element, where the inclined arms are self supporting, in that they do not require a metal bracket, or other means, to hold them at the required angle of divergence. The elements are designed to give the required strength, while keeping to a minimum the use of plastics material in the mounting region. In FIGS. 17 to 19(a), components which correspond to those shown in FIGS. 12 and 13 are indicated by like reference numerals.

In FIGS. 17 and 17(a) the two arms 21 and 22 of the element 11 are joined together immediately behind their leading edges by a web 80 with a central hole 81 which is appropriately oversized in relation to the diameter of the mounting bolt 23. At the base the arms of the element are relieved upwardly from front to rear at 82, so that, on rearward deflection of the tips of the element 11, binding at the base is prevented. As shown, an optional resilient, cone-shaped spring 24A is provided forward of the nut 25 and washer 57 of the mounting bolt 23. The design of the element has the advantage that the relatively thin plastic joining web 80 can bend in response to a sudden tip load experienced by one or both of the arms 21 or 22. This safety feature is in addition to the arms 21 and 22 themselves being able to twist and/or bend laterally under appropriate load conditions. The additional feature makes it possible to achieve a high degree of safety even if the element 11 is fastened directly to the upstanding flange 14A of the mounting bar 12. Should it be desired to limit or prevent the plastics web 80 from bending, then the trailing face may be covered by a metal plate of appropriate size, or a short section of channel may be used which provides a good fit between the two arms 21 and 22.

FIGS. 18 and 18(a) show an element 11 also designed for tangential attachment to the upstanding flange 14A of an angle-section mounting bar 12. The relief 82 at the base of the arms 21 and 22 is carried partly into the joining web 80, which is marginally thicker than in FIGS. 17 and 17(a). In the example of FIGS. 18 and 18(a) the optional resilient, cone-shaped spring 24A is shown fitted in front of the upstanding flange 14A of the mounting bar 12.

The self-supporting element 11 shown in FIGS. 19 and 19(a) is designed for radial attachment to the angle-iron mounting bar 12. The optional resilient, cone-shaped spring 24A is located beneath the flange 14 of the mounting bar 12 which supports the base of the element 11. Use has been made of the plastic moulding process to form a hexagonal recess 83 in the lower base 84 of the element 11, to accommodate the securing bolt head 23 and to prevent it from turning when tightening or releasing the nut 25. The width of the base portion 84 of the plastics element 11 is so chosen that heavy loads imposed from one side would cause the element 11 to lift on that side. Depending on the operating conditions for which the crop engaging rotor is intended, the tilting capability can be matched by appropriately selecting the width of the base 84 (overall or by rounding the corners) and by adjusting the radial tension. The same possibilities apply to the control of resistance to rearward tilting.

It should be noted that many details of the design of the attachment region of a self-supporting plastic element 11 may be varied whilst maintaining the principles of the disclosures. For example at the extreme the base region 84 may be a block with or without a hollow, plastics-saving space beneath the seat 83 for the head of the bolt 23.

I claim:

1. A crop engaging device comprising:
   support means including a rotor and frame means for mounting said rotor for rotation and for movement of said frame means along the ground;
   a plurality of outwardly extending crop engaging elements secured to the rotor for engaging crop in a crop flow during rotation;
   each crop engaging element having a base portion adapted for securement to the rotor, and a crop engaging portion extending outwardly from the rotor into the crop flow and inclined relative to the rotor in a plane generally transverse to the direction of movement of the crop engaging portion, each said crop engaging portion being inclined at a selected predetermined angle,
   said rotor comprising a plurality of support members each having a base portion and an upstanding shielding portion, said upstanding shielding portion being arranged in front of the base portion of the crop engaging element relative to the direction of movement of the crop engaging element,
   each element base portion being secured to one of the said support members by an axial fastening means having a principal axis along which it extends through the support member to secure the element thereto,
   the support members and each crop engaging element having cooperating abutment regions such as to at least inhibit rotation of the crop engaging element away from its required operating position under normal load conditions, but such as to allow the crop engaging element to be yielding under an abnormal load by movement of the crop engaging portion rearwardly in relation to the direction of movement of the element, the rear surface of the upstanding shielding portion of the support member being utilised to provide at least one of the said abutment regions for at least inhibiting rotation of the crop engaging element away from its required operating position, and the mounting of each element being such that the retaining force in the axial fastening means retaining the element during yielding is predominantly tension along the said axis of the fastening means.

2. A device according to claim 1 in which the said yielding movement is predominantly a pivotting movement of the element about an axis transverse to the principal axis of the axial fastening means.

3. A device according to claim 2 in which the said cooperating abutment surfaces are effective to at least inhibit rotation of the crop engaging element about the principal axis of the fastening means.

4. A device according to claim 1 in which the said rotor comprises an elongate support member extending transverse to the intended movement of the crop engaging elements relative to the crop with a plurality of crop engaging elements positioned along the elongate support member, the cooperating abutment regions being arranged to at least inhibit rotation of the element about an axis extending into the crop perpendicular to the said base portion of the support member, and the said yielding movement comprising predominantly a pivotting movement about an axis generally aligned along the length of the elongate support member.

5. A device according to claim 1 in which each crop engaging element comprises two outwardly extending arms which diverge from each other in the outward direction and in a plane generally transverse to the intended movement of the arms with or relative to the crop, the element being secured to the support means at the region of conjunction of the two arms.

6. A device according to claim 5 in which the said element includes at the region of conjunction of the arms a web interconnecting the arms and extending in the said transverse plane.

7. A device according to claim 6 in which the said axial fastening means passes through the said web.

8. A device according to claim 1 in which the axial fastening means secures the crop engaging element to the support means by passing through the base portion of the element along the said principal axis of the fastening means.

9. A device according to claim 8 in which the said principal axis of the axial fastening means extends perpendicular to said base portion of said support means.

10. A device according to claim 1 in which the support means includes at each element a rigid bracket shaped to support the crop engaging portion of the element at the said inclination relative to the support means.

11. A device according to claim 1 in which the support means includes at each crop engaging element a rigid bracket engaged with the base portion of the element, said fastening means securing the element by passing through the bracket.

12. A device according to claim 11 in which the bracket is arranged to move at least predominantly with the crop engaging element during the said yielding movement.

13. A device according to claim 1 in which at least some of the cooperating abutment regions are constituted by the said rear surface of the upstanding shielding portion of the support member and the leading surface of the crop engaging element, the arrangement being such that during the said yielding movement the crop engaging element moves rearwardly away from the said shielding portion of the support member with the said abutment regions moving apart.

14. A device according to claim 13 in which each crop engaging element is formed from a flat strip of material arranged with an edge surface of the strip abutting against the said upstanding shielding portion of the support member.

15. A device according to claim 1 in which the said yielding movement of the crop engaging portions of the elements is produced at least in part by a rocking movement of the element as a whole.

16. A device according to claim 1 in which the said yielding movement of the crop engaging portions of the elements is produced at least in part by deforming of the crop engaging portions of the elements.

17. A device according to claim 1 in which the axial fastening means includes resilient biasing means urging the base portion of the crop engaging element against the support member but allowing movement of the element away from the support member along the direction of the axis of the fastening means to provide at least in part the said yielding movement.

18. A device according to claim 1 in which the crop engaging elements are made of synthethic plastics material.

19. A device according to claim 18 in which the said synthetic plastics material is selected from the group comprising nylon, polyproplene and polyurethene.

20. A crop engaging device comprising:
support means including a rotor and frame means for mounting said rotor for rotation and for movement of said frame means along the ground;
a plurality of outwardly extending crop engaging elements secured to the rotor for engaging crop flow during rotation;
each crop engaging element having a base portion adapted for securement to the rotor, and a crop engaging portion extending outwardly from the rotor into the crop flow and inclined relative to the rotor in a plane generally transverse to the direction of movement of the crop engaging portion, said element being formed as two outwardly extending arms which diverge from each other in the outward direction and in a plane generally transverse to the direction of movement of the arms, the arms being secured to the support means at the region of conjuction of the two arms, each said crop engaging portion being included at a selected predetermined angle,
said rotor comprising a support member having a base portion and an upstanding shielding portion, said upstanding shielding portion being arranged in front of the base portion of the crop engaging element relative to the direction of movement of the crop engaging element,
each element base portion being secured to the base portion of the said support member by an axial fastening means having a prinicipal axis along which it extends through the base portion of the rotor to secure the element thereto, said axial fastening means extending substantially radially relative to the rotor through the base portion of the element and through the base portion of the support member,
the support member and each crop engaging element having cooperating abutment regions such as to at least inhibit rotation of the crop engaging element away from its required operating position under normal load conditions, but such as to allow the crop engaging element to be yielding under an abnormal load by movement of the crop engaging portion rearwardly in relation to the direction of movement of the element, the leading surface of the crop engaging element abutting against the trailing surface of the upstanding shielding portion of the support member so as to prevent or inhibit rotation of the element about the axis of the axial fastening means, but such as to allow the crop engaging element to be yielding in operation by movement of the arms of the element rearwardly away from the upstanding shielding portion of the support member, and the mounting of each element being such that the retaining force in the axial fastening means retaining the element during yielding is predominantly tension along the said axis of the fastening means.

21. A device according to claim 20 in which each crop engaging element comprises a single member formed of resilient material and shaped to form said two outwardly extending arms, said member also being shaped to form said base portion linking said two arms, and a strenghtening web extending in a plane substantially perpendicular to said base portion and transverse to said direction of movement of said arms.

22. A device according to claim 21 in which said crop engaging elements are made of synthetic plastics material.

23. A crop engaging device comprising:
  support means including a rotor and frame means for mounting said rotor for rotation and for movement of the frame means along the ground;
  a plurality of outwardly extending crop engaging elements secured to the rotor for engaging crop in a crop flow during rotation;
  each crop engaging element having a base portion adapted for securement to the rotor, and a crop engaging extending outwardly from the rotor into the crop flow and inclined relative to the rotor in a plane generally transverse to the direction of movement of the crop engaging portion, said element being formed as two outwardly extending arms which diverge from each other in the outward direction and in a plane generally transverse to the direction of movement of the arms, the arms being secured to the support means at the region of conjunction of the two arms, each said crop engaging portion being inclined at a selected predetermined angle,
  said rotor comprising a support member having a base portion and an upstanding portion extending outwardly from the base portion of the rotor towards the region of crop flow
  each element base portion being secured to the upstanding portion of said support member by an axial fastening means having a principal axis along which it extends through the upstanding portion of the support member to secure the element thereto, said axial fastening means extending substantially tangentially relative to the rotor through the said upstanding portion of the support member,
  the support member and each crop engaging element having cooperating abutment regions such as to at least inhibit rotation of the crop engaging element away from its required operating position under normal load conditions, but such as to allow the crop engaging element to be yielding under an abnormal load by movement of the crop engaging portion rearwardly in relation to the direction of movement of the element, both the upstanding portion of the support member and the base portion of the support member being utilised to provide abutment regions for at least inhibiting rotation of the crop engaging element away from its required operating position, and the mounting of each element being such that the retaining force in the axial fastening means retaining the element during yielding is predominantly tension along the said axis of the fastening means.

24. A device according to claim 23 in which each said crop engaging element comprises a single member formed of resilient material and shaped to form said two outwardly extending arms, said member also being shaped to form said base portion which is arranged to link said two arms and to extend in a plane transverse to said direction of movement of said arms.

25. A device according to claim 24 in which said base portion of said element extends substantially parallel to and abuts against said upstanding portion of said support means, the arrangement being such that during the said yielding movement said crop engaging element tips away from said upstanding portion of said support means with said abutting regions moving apart.

26. A device according to claim 24 in which said crop engaging elements are made of synthetic plastics material.

* * * * *